(12) United States Patent
Katzman et al.

(10) Patent No.: US 11,314,819 B2
(45) Date of Patent: Apr. 26, 2022

(54) SYSTEMS, APPARATUSES, AND METHOD FOR DOCUMENT INGESTION

(71) Applicant: Amazon Technologies, Inc., Seattle, WA (US)

(72) Inventors: Jared Lee Katzman, Brooklyn, NY (US); Nithin Kunala, Baldwin Place, NY (US); Bing Xiang, Mount Kisco, NY (US); Krishnakumar Rajagopalan, Edison, NJ (US); Andrew M. Grant, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/697,964

(22) Filed: Nov. 27, 2019

(65) Prior Publication Data
US 2021/0157861 A1    May 27, 2021

(51) Int. Cl.
*G06F 16/93* (2019.01)
*G06F 9/54* (2006.01)
*G06F 16/31* (2019.01)
*G06F 16/951* (2019.01)

(52) U.S. Cl.
CPC .............. *G06F 16/93* (2019.01); *G06F 9/54* (2013.01); *G06F 16/31* (2019.01); *G06F 16/951* (2019.01)

(58) Field of Classification Search
CPC .............................. G06F 16/93; G06F 16/951
See application file for complete search history.

(56) References Cited

U.S. PATENT DOCUMENTS

| | | | |
|---|---|---|---|
| 7,185,001 B1 | 2/2007 | Burdick et al. | |
| 2004/0070613 A1* | 4/2004 | Sprague | G06F 16/958 715/762 |
| 2006/0195431 A1* | 8/2006 | Holzgrafe | G06F 16/434 |
| 2008/0033915 A1 | 2/2008 | Chen et al. | |
| 2012/0239646 A1 | 9/2012 | Bailey et al. | |
| 2014/0297571 A1 | 10/2014 | Beamon et al. | |
| 2015/0186527 A1* | 7/2015 | Rao | G06F 16/185 707/711 |
| 2015/0261859 A1 | 9/2015 | Isensee et al. | |

(Continued)

FOREIGN PATENT DOCUMENTS

| | | |
|---|---|---|
| WO | 2014182894 A2 | 11/2014 |
| WO | 2015179508 A1 | 11/2015 |

OTHER PUBLICATIONS

MS Marco, "Ms Marco Submission Instructions", Available online at <http://www.msmarco.org/submission.aspx>, Retrieved on Dec. 2, 2019, 2 pages.

(Continued)

*Primary Examiner* — Hau H Hoang
(74) *Attorney, Agent, or Firm* — Nicholson De Vos Webster & Elliott LLP

(57) ABSTRACT

Techniques for intaking one or more documents are described. An exemplary method includes receiving an ingestion request to ingest a document; extracting text from the document; pre-processing the extracted text to generate pre-processed text that is predictable and analyzable; generating an index entry for the extracted text, the index entry to map the extracted text to a reserved field of a plurality of reserved fields; and storing the extracted text, index entry, and pre-processed text in at least one data storage location.

20 Claims, 22 Drawing Sheets

(56) References Cited

U.S. PATENT DOCUMENTS

| | | | |
|---|---|---|---|
| 2015/0312259 A1* | 10/2015 | Alpha | H04L 63/0428 726/4 |
| 2016/0078102 A1 | 3/2016 | Crouch et al. | |
| 2016/0232143 A1* | 8/2016 | Fickenscher | G06F 40/169 |
| 2016/0239487 A1 | 8/2016 | Potharaju et al. | |
| 2018/0365321 A1 | 12/2018 | Ke et al. | |
| 2019/0205472 A1 | 7/2019 | Kulkarni | |
| 2020/0364233 A1* | 11/2020 | Chan | G06N 7/005 |

OTHER PUBLICATIONS

Munro, Robert, "Diversity Sampling Cheatsheet", Towards Data Science, Sep. 14, 2019, 5 pages.

Radford et al., "Better Language Models and Their Implications", Available online at <https://openai.com/blog/better-language-models/>, Retrieved on Dec. 2, 2019, pp. 1-14.

Non-Final Office Action, U.S. Appl. No. 16/697,979, dated Aug. 31, 2021, 21 pages.

International Search Report and Written Opinion for International Application No. PCT/US2020/061932, dated Mar. 12, 2021, 11 pages.

Non-Final Office Action for U.S. Appl. No. 16/697,948, dated Apr. 29, 2021, 16 pages.

Bevilacqua et al., "Quasi Bidirectional Encoder Representations from Transformers for Word Sense Disambiguation", Proceedings of Recent Advances in Natural Language Processing, Sep. 2019, pp. 122-131.

Zhang et al., "Deep Cross-Modal Projection Learning for Image-Text Matching", ECCV 2018, 2018, 16 pages.

Non-Final Office Action, U.S. Appl. No. 16/698,080, dated Feb. 18, 2022, 15 pages.

Notice of Allowance, U.S. Appl. No. 16/697,948, dated Feb. 17, 2022, 8 pages.

Non-Final Office Action, U.S. Appl. No. 16/698,027, dated Mar. 15, 2022, 34 pages.

Final Office Action, U.S. Appl. No. 16/697,979, dated Mar. 14, 2022, 17 pages.

\* cited by examiner

| FIELD NAME 901 | DATA TYPE 903 |
|---|---|
| DATA SOURCE | STRING |
| DOCUMENT TYPE | STRING |
| BODY | STRING |
| TITLE | STRING |
| VIEW COUNT | INT |
| SOURCE URI | STRING |
| CATEGORY | STRING |
| MODIFICATION DATE | DATE |
| CREATION DATE | DATE |
| DESCRIPTION | STRING |
| AUTHORS | STRING |
| TAGS | STRING |
| ... | ... |

*FIG. 9*

GRAPHICAL USER INTERFACE 1300

QUERY 1304:
(EXAMPLE: HOW MUCH DOES PACKAGE PICK-UP COST?)

PLEASE SELECT THE FOLLOWING ANSWER(S) THAT ARE RELEVANT TO THE INDICATED QUERY
1302

NUMBER OF CANDIDATE ANSWERS
1306

CANDIDATE ANSWER 1 WITH HIGHLIGHTING 1308A

There is no charge for this option.
We will pick up your return at the address of your choice.
— 1312A

FROM: HTTPS://AMAZON.COM/BIN/DATASET1 — 1314A

FEEDBACK INPUT
1310A
[✓]

· · ·

CANDIDATE ANSWER X WITH HIGHLIGHTING 1308B

If you choose the Pickup option and the return is not a result of our error, you will be charged a convenience fee of $XX.XX for the Pickup.
— 1312B

FROM: HTTPS://AMAZON.COM/BIN/DATASET1 — 1314B

FEEDBACK INPUT
1310B
[✓]

SUBMIT
1316

*FIG. 13*

EXAMPLE SYNTHETIC QUESTION GENERATION 1700

KNOWN QUESTION 1702: HOW MUCH DOES CARRIER PICK UP COST <EOQ>

PASSAGE WITH KNOWN ANSWER 1704: THERE IS NO CHARGE FOR THIS OPTION. CARRIER PICKUP OPTION : CARRIER WILL PICK UP YOUR RETURN AT THE ADDRESS OF YOUR CHOICE. IF YOU CHOOSE THE CARRIER PICKUP OPTION AND IF THE RETURN IS NOT A RESULT OF OUR ERROR, YOU WILL BE CHARGED A CONVENIENCE FEE OF $XX.XX FOR THE CARRIER PICKUP.

CANDIDATE QUESTIONS GENERATED BY MODEL 1706:

QUESTION 0: HOW MUCH DOES CARRIER PICK UP COST <EOQ>
QUESTION 1: HOW MUCH IS CARRIER PICK UP <EOQ>
QUESTION 2: WHAT IS THE COST TO PICK UP A PACKAGE FROM CARRIER <EOQ>
QUESTION 3: WHAT IS THE COST OF A CARRIER PICKUP <EOQ>
QUESTION 4: HOW MUCH DOES CARRIER PICK UP COST <EOQ>
QUESTION 5: HOW MUCH DOES CARRIER PICKUP FEE <EOQ>
QUESTION 6: HOW MUCH IS CARRIER PICKUP <EOQ>
QUESTION 7: HOW MUCH DOES IT COST TO PICK UP A PACKAGE FROM CARRIER <EOQ>
QUESTION 8: HOW MUCH DOES CARRIER PICKUP COST <EOQ>
QUESTION 9: HOW MUCH DOES CARRIER PICK-UP COST <EOQ>

*FIG. 17*

EXAMPLE SYNTHETIC QUESTION GENERATION 1800

KNOWN QUESTION 1802: CAN I RETURN A PRODUCT <EOQ>

PASSAGE WITH KNOWN ANSWER 1804: WE DO NOT REFUND THE ORIGINAL SHIPPING FEES, HOWEVER, ALL PRODUCT PACKAGING AND CERTIFICATES OF AUTHENTICITY, GRADING, AND APPRAISAL MUST BE RETURNED WITH THE PRODUCT. ANY PRODUCT(S) RETURNED WITHOUT ORIGINAL DOCUMENTATION WILL BE REJECTED. ANY PRODUCT(S) THAT HAVE BEEN RESIZED, DAMAGED OR OTHERWISE ALTERED AFTER DELIVERY WILL NOT BE ACCEPTED FOR RETURN. ELIGIBLE PRODUCT(S) MUST BE RETURNED USING A TRACKABLE SHIPPING METHOD.

CANDIDATE QUESTIONS GENERATED BY MODEL 1806:

QUESTION 0: CAN I RETURN A PRODUCT WITHOUT A TRACKING NUMBER <EOQ>
QUESTION 1: IS A PRODUCT A CERTIFIED PRODUCT <EOQ>
QUESTION 2: IS A PRODUCT REFUNDABLE <EOQ>
QUESTION 3: IS A PRODUCT A RETURN <EOQ>
QUESTION 4: DOES THE ORIGINAL SHIPPING FEE FOR A PRODUCT RETURN INCLUDE A TRACKING FEE <EOQ>
QUESTION 5: CAN I RETURN AN ITEM WITHOUT ORIGINAL PACKAGING <EOQ>
QUESTION 6: DOES THE ORIGINAL PACKAGING INCLUDE THE SHIPPING FEE <EOQ>
QUESTION 7: IS IT OK TO RETURN A PRODUCT AFTER IT HAS BEEN SHIPPED <EOQ>
QUESTION 8: DOES A PRODUCT HAVE TO BE RETURNED <EOQ>

FIG. 18

SYSTEMS, APPARATUSES, AND METHOD FOR DOCUMENT INGESTION

BACKGROUND

Enterprises are generating more data than ever before. Trying to find what data is relevant from that generated data is a non-trivial task. Traditional search solutions rely on keyword-based document analysis to find specific terms in the data which a general-purpose approach inherently limited by its inability to "understand" the content at a more granular level.

BRIEF DESCRIPTION OF DRAWINGS

Various embodiments in accordance with the present disclosure will be described with reference to the drawings, in which:

FIG. 9 illustrates embodiments of exemplary reserved fields for use in ingestion.

FIG. 13 illustrates embodiments of a graphical user interface to be used in active learning of question and answer(s) for training a machine learning model.

FIG. 17 illustrates a first set of example candidate questions generated by a question generation model trained on known question and answer pairs.

FIG. 18 illustrates a second set of example candidate questions generated by a question generation model trained on known question and answer pairs.

DETAILED DESCRIPTION

Figure 1:
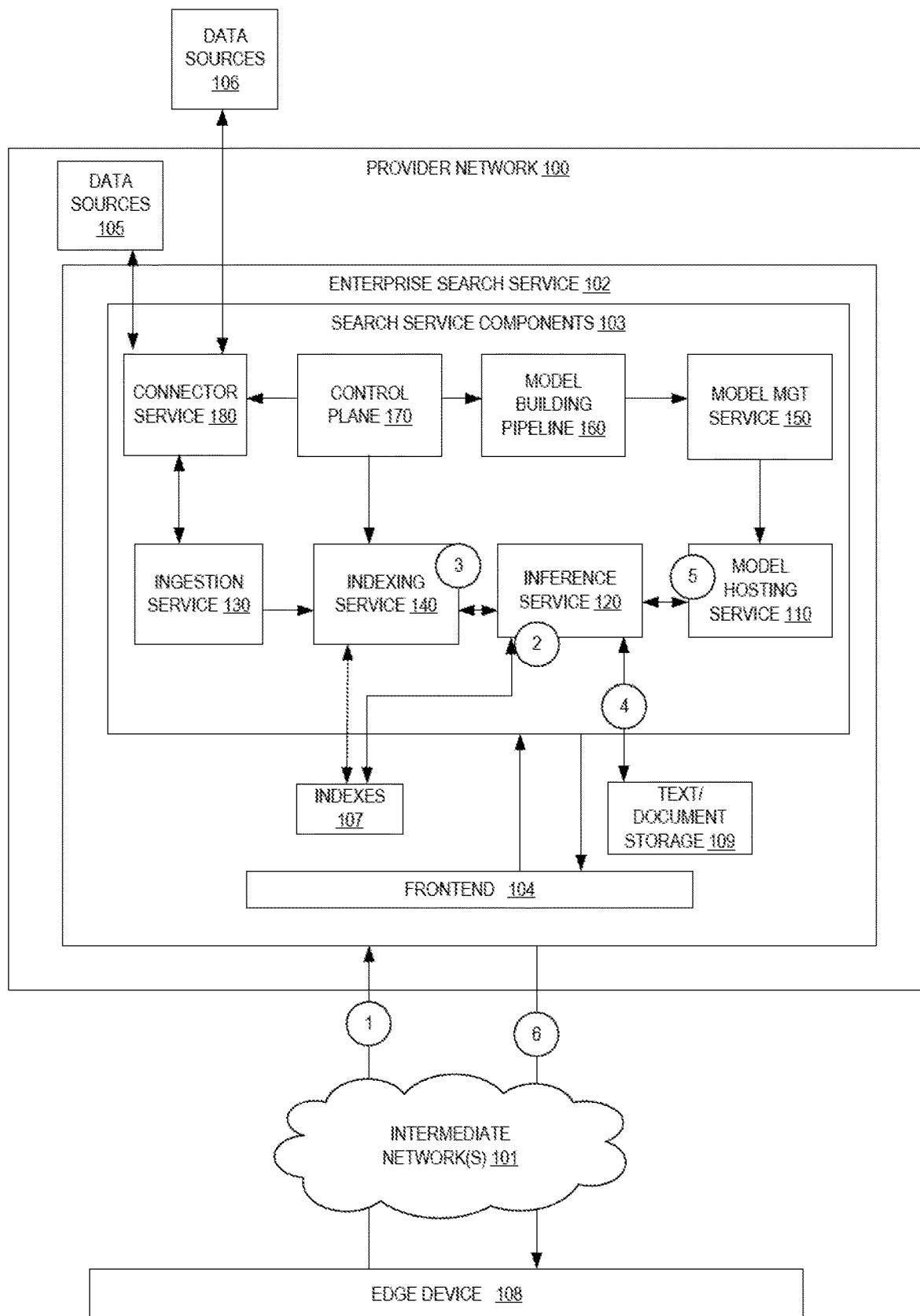
FIG. 1 illustrates embodiments of an enterprise search service.

The present disclosure relates to methods, apparatus, systems, and non-transitory computer-readable storage media for indexing and searching text-based documents using machine learning. Documents are acquired, text from the documents extracted and indexed, etc. to make them searchable using term-based or question-based queries. These text-based documents including frequently asked questions (FAQs) are to be searched according to a user query for one or more top ranked (most relevant) documents, one or more top ranked passages (where a passage is a limited number of contiguous lines that have been extracted from a given document), and/or one or more top ranked FAQs.

Detailed herein are embodiments of an enterprise search service that enables users to intuitively search unstructured data using natural language. It returns specific and personalized answers to questions, giving end users an experience that comes closer to interacting with a human expert.

In keyword-based document analysis approaches, it is hard to determine any sort of context of the content. Embodiments detailed herein allow for document corpus hosted internally or externally to be accessed and indexed those documents. The indexing helps to provide a context of a document and provides a semblance of "structure" to an unstructured document. In some instances, a set of reserved fields for the indexes gives a more uniform context to labels in a document. As such, embodiments of the enterprise search service described below allow for the answering of factoid and non-factoid (e.g., how, what, why) questions by extracting relevant information from a document corpus. Such questions (e.g., "What is the latest version of software X") are usually answerable in a few words. In some embodiments, the enterprise search service allows for the answering of short questions that can be answered in a few lines such as those found in a frequently asked questions document (e.g., "What is the difference between the IP default-gateway, IP default-network, and IP route 0.0.0.0/0 commands?"). In some embodiments, the enterprise search service allows for the answering of descriptive questions through the identification of an entire relevant document where the answer is the entire document. For example, "What is the CLI for Brazil?"

Another deficiency in some search systems is showing the user what is relevant about the search result. While some search results bold a particular word or phrase in the result, that is the extent of helping a user identify what is the "correct" answer to the search. Detailed herein are embodiments of further emphasizing the "correct" answer based on the confidence of the machine learning model(s) that found the "correct" answer. Answers that are not as "correct" are either not emphasized, or emphasized in a different manner.

Many enterprises use log analytics or have use cases like customer service, searching business reports and FAQs, that could potentially benefit from embodiments detailed herein. The embodiments detailed enable these enterprises to build smarter enterprise search applications that cover a wider range of sources securely, and provide strong natural language understanding capabilities, at a fraction of the time and complexity needed to implement their own search solution.

FIG. 1 illustrates embodiments of an enterprise search service. The enterprise search service 102 allows for the querying or searching of documents and/or proper subsets thereof of an enterprise using one or more machine learning models. Details of various aspects of this enterprise search service 102 are discussed below. Prior to any searching, the documents and/or proper subsets thereof have been ingested prior to such querying. In some embodiments, the enterprise search service 102 provides the capability to ingest documents from data sources 105 internal to a provider network 100 and data sources 106 external to the provider network 100 (e.g., stored at a third-party location, stored locally, etc.).

An ingestion service 130 allows for the ingestion of documents into the enterprise search service 102. Documents may be pulled from data sources (e.g., in response to a request) and/or pushed from data sources (e.g., a synchronization of when a document is added or altered). The ingestion service 130 may also fetch access control lists (ACLs) associated with the documents. The ACLs can be used to determine if a search result is allowed to be served.

To get documents from the data sources 105 or 106, the ingestion service couples to a connector service 180 which offers a plurality of connectors to connect to different data sources and receive data (as a push or a pull) from those sources according to the appropriate protocol for a particular data source. Note that different data sources may use different transmission protocols, storage protocols, encryption protocols, etc.

The data connectors of the connector service 180 are configured using a control plane 170. This control plane 170 contains workflows for resource management of the enterprise search service 102. The control plane 170 may also be used to configure a model building pipeline 160 which builds specific models, vocabularies, and embeddings to be hosted in the model hosting service 110 and used in answering a query. Note that in some embodiments, a model management service 150 may be used to refresh a given model.

The ingestion service 130 also extracts text from documents, pre-processes the extracted text (e.g., tokenize, normalize, and/or remove noise), and calls an indexing service to generate index entries for text, and causes the documents (or subset thereof) to be stored. The indexing service 140 indexes documents that have been acquired by the ingestion service 130 into one or more indexes 107. An index is a data structure of organized data that maps the data to a plurality of fields. Each document or subset of a document (e.g., passage) is identified with a unique identifier. In some embodiments, the index is comprised a plurality of JSON documents.

In some embodiments, the index is an inverted index that lists every unique word that appears in any document and identifies all of the documents each word occurs in. An index can be thought of as an optimized collection of documents and each document is a collection of fields, which are the key-value pairs that contain data. Each indexed field has a dedicated, optimized data structure. For example, text fields are stored in inverted indices, and numeric and geo fields are stored in BKD trees.

The indexing service 140 may be schema-less, which means that documents can be indexed without explicitly specifying how to handle each of the different fields that might occur in a document. When dynamic mapping is enabled, the indexing service 140 automatically detects and adds new fields to the index. However, as noted below, a schema of reserved fields may be used to map detected data into datatypes. The reserved fields allow for the distinguishing between full-text string fields and exact value string fields, performing language-specific text analysis, optimizing fields for partial matching, and/or the use datatypes that are not automatically detected.

Once a set of documents has been indexed, a query against that set of documents may be made via an inference service 120. The inference service 120 handles search queries from end users by performing query understanding (query classification and enrichment), invoking the indexing service 140 to get a relevant set of documents for the query, retrieving the relevant set of documents, and invoking one or more models of the model hosting service 110 to deduce a search result for given query.

Examples of models utilized by the inference service 120 that are run in the model hosting service 110 include, but are limited to a question/answer (e.g., reading comprehension) which extracts answers from passages, a document/passage ranking model which sorts documents in an order of relevance with respect to the query, and a FAQ matching model which attempts to identify a correct the right answer for a given question from a given FAQ document.

A frontend 104 of the enterprise search service 102 couples to one or more search service components 103 to provide a way for external communications (e.g., from edge device 108, etc.) with the enterprise search service 102. For example, through the frontend 104 a user may communicate with the ingestion service 130 to configure and start an ingestion of one or more documents, provide a query to be served by the inference service 120, etc.

As shown, in some embodiments the enterprise search service 102 is a service provided by a provider network 100. The provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 101 (e.g., the internet) via one or more interface(s), such as through use of application programming interface (API) calls, via a console implemented as a website or application, etc. The interface(s) may be part of, or serve as a front-end to, a control plane (e.g., control plane 170) of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

Circles with numbers inside of them represent exemplary actions that may be taken for performing an inference (query). At circle 1, an inference request is sent by an edge device 108 to the enterprise search service 102. The frontend 104 calls the inference service 120 which begins processing the request at circle 2.

The processing of the request includes accessing one or more indexes 107 via the indexing service 140 at circle 3 to get identifiers of sets of documents to analyze, accessing the identified sets of documents (or text thereof) from document storage 109, and providing the documents (or text thereof) and the query to one or more machine learning models in the model hosting service 110 at circle 5 to determine one or more of top documents, a top passage, and/or a top FAQ.

The result of the determination by the one or more machine learning models is provided the requestor at circle 6 (subject to any restrictions). The provision of the result may also include using an enhanced display.

Figure 2:
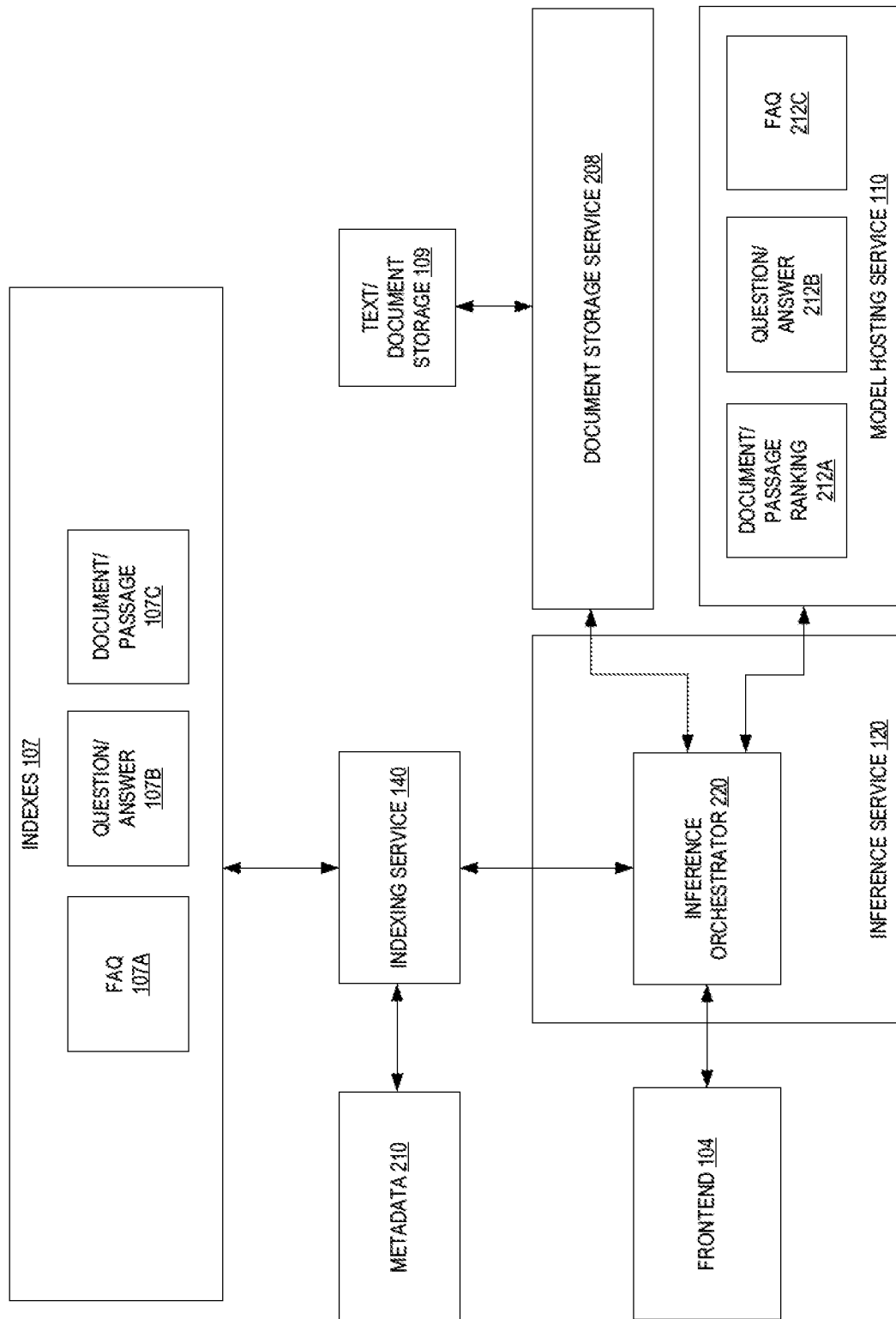
FIG. 2 illustrates embodiments of the enterprise search service used for providing inference functionality.

FIG. 2 illustrates embodiments of the enterprise search service 102 used for providing inference functionality. In particular, the aspects shown may be used to respond to a search query on a set of documents. The frontend 104 takes in a search request (or query) and provides that request to an inference orchestrator 220 of the inference service 120.

In some embodiments, the query is submitted as an application programming interface (API) call. In some embodiments, a default response to such a query includes a relevant passage, a matching FAQ, and a relevant document. The query may contain one or more fields indicating how the search is to be performed and/or what is to be returned. This one or more fields include, for example, one or more of: an attribute filter field which enables filtered searches based on document attributes; an exclude document attributes field indicating what attributes to exclude from a response; a facets field defining what document attributes to count; an include document attributes field indicating the document attributes to include in a response; an index identifier field indicating the index(es) to search; a page number field indicating the number of pages of results to return; a page size field indicating the size of pages of results to return; a query result type configuration field which sets the type of query (e.g., FAQ, passage, document); a query text field which includes a string of text to search for; and a user context field which identifies the end user making the query so it can be determined if the query result should be filtered based on the user (e.g., an access control list indicates that the user is not allowed to see the content such a regular employee searching for health records of another employee).

The inference orchestrator 220 co-ordinates various services to perform an inference using the query. In some embodiments, the inference orchestrator 220 includes a state machine or algorithm defining the actions to take. In some embodiments, the inference orchestrator 220 performs query classification and enrichment (or couples to a component that does). For example, in some embodiments, key phrases, entities, syntax, topics, and/or classifications are extracted. In some embodiments, a classifier machine learning model determines what type of question is being presented. Factoid questions and non-factoid questions may get different treatment with respect to what models are used to determine top results and how results are shown.

The inference orchestrator 220 couples to the indexing service 140 and utilizes the indexing service 140 to access one or more indexes 107 to get matching document identifiers for the query. The indexes 107 include a FAQ index 107A, a question/answer index 107B, and a document/passage index 107C. In some instances, the inference orchestrator 220 provides an indication of what index(es) to use. In some embodiments, the metadata 210 provides a physical location of the indexes 107 for the indexing service 140 to use.

The result (e.g., document identifiers) of various index queries are received by the inference orchestrator 220 to use to retrieve one or more documents for use by one or more machine learning models (e.g., FAQ model 212C, question/answer model 212B, and document/passage ranking model(s) 212A) hosted by the model hosting service 110. The inference orchestrator 220 retrieves the identified documents (e.g., an entire document, passage, or FAQ) from text/document storage 109 using document storage service 208. The retrieved documents are then supplied, along with aspects of the query, to one or more of the models 212A-C of the model hosting service 110 to identify one or more of: one or more top ranked documents, one or more top ranked passages, and/or one or more top ranked FAQs. Note that the models 212A-C provide confidence scores of their outputs. Note too that the document storage service 208 stores document artifacts that will be used at the time of inference to extract the answer for a given query.

Figure 3:
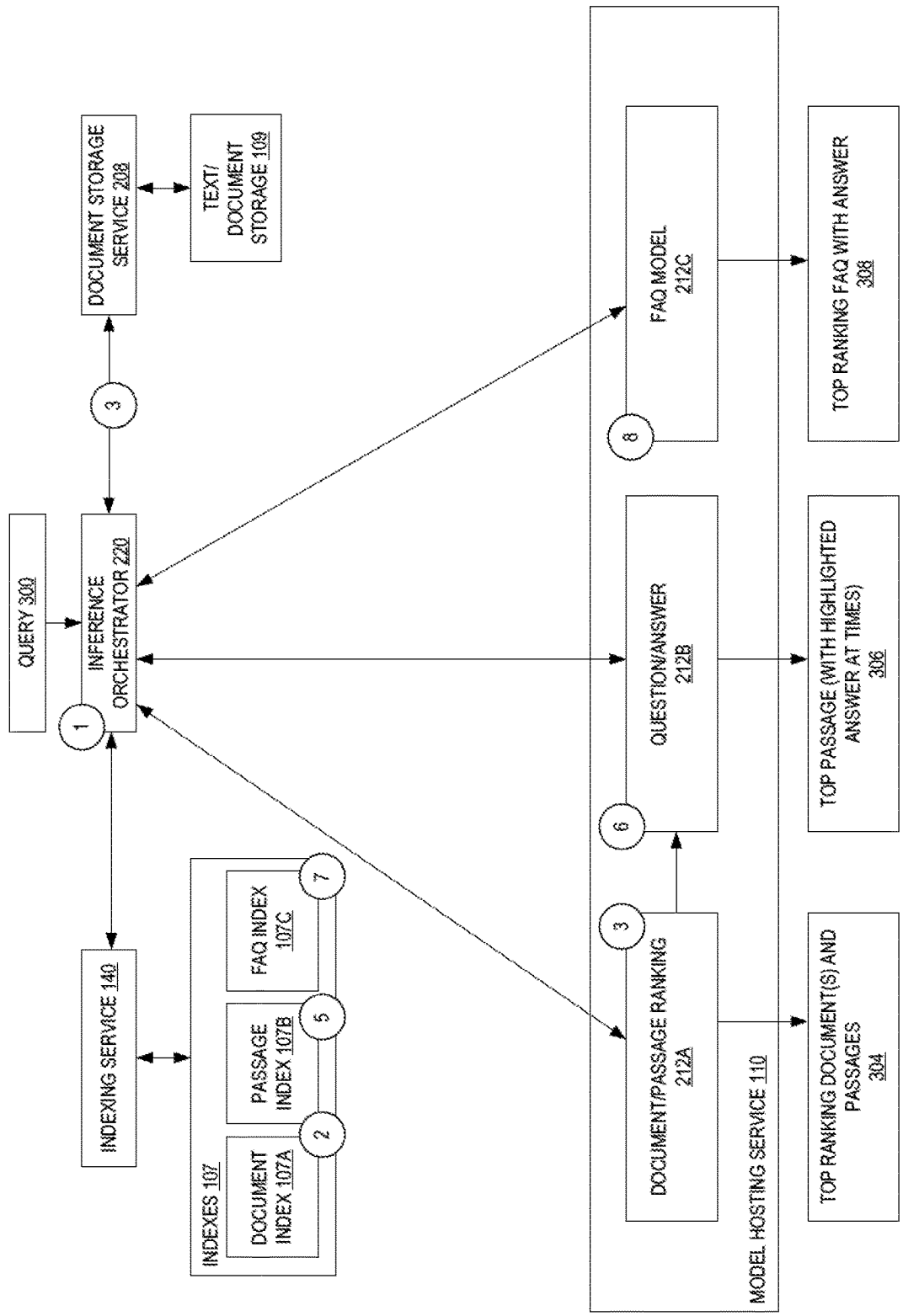
FIG. 3 illustrates embodiments of the enterprise search service used for providing inference functionality.

FIG. 3 illustrates embodiments of the enterprise search service 102 used for providing inference functionality. A query 300 is received by the inference orchestrator 220. This is shown at circle 1. The inference orchestrator 220 fires the query against one or more indexes 107.

In some embodiments, the query is fired against the document index 107A and the passage index 107B (shown at circle 2). An identification of set of "top" documents (e.g., top 1,000 documents) and "top" passages (e.g., 5,000 passages) are provided from the indexing service 140 back to the inference orchestrator 220. The associated documents and passages are retrieved (shown at circle 3) and then sent to the document/passage ranking model(s) 212A.

The document/passage ranking model(s) 212A analyzes and re-ranks the top documents based on relevance scores and, for a top subset (e.g., 100) of the ranked documents, determines a set number (e.g., 3) of passages for each of the top subset of ranked documents (shown at circle 4). In some embodiments, a feature-based deep cross network (DCN) analyzes and re-ranks the top documents. Further, in some embodiments, a bidirectional encoder representations from transformers (BERT) model takes the ranking top subset of documents and finds the passages and outputs relevance scores. The relevance scores of the DCN and BERT are combined to obtain the final reranking of top documents. In some embodiments, when the data is purely textual documents with no metadata fields, then the DCN can be bypassed, and only the BERT used for reranking of the top 100 documents directly. Note that an output of the document/passage ranking model(s) 212A is a set of top ranking document(s) 304 and/or top ranking passages. In some embodiments, the top ranking passages are found using a union of the top ranking documents and the indexed passages.

The question and answer model 212B is used to determine a set of one or more top passages for the query. The query is fired against the passage index 107B at circle 5 to find a top number (e.g., 100) of passages which are retrieved and sent to the document/passage ranking model(s) 212A for analysis and reranking. In particular, in some embodiments, the BERT model receives the top passages and re-ranks the passages and sends top few (e.g., 5) to the question and answer model 212B at circle 6. In some embodiments, the question and answer model 212B is also BERT-based. The question and answer model 212B analyzes these few passages and outputs a top passage 306 that is, at times, highlighted) with multiple answer candidates. In some embodiments, when the top passage's confidence score exceeds a first threshold it is displaced. In some embodiments, when aspects the top passage's confidence score exceeds a second, more stringent threshold, those aspects of the top passage are highlighted as the best answer while less confident scores are otherwise enhanced (e.g., bolded).

The FAQ model 212C is used to determine a set of one or more top FAQs for the query. The query is fired against the FAQ questions index 107C at circle 7 and the top set of matching questions are sent to the FAQ model 212C from the text/document storage 109. The FAQ model 212C re-ranks the top set of questions and returns the most relevant questions along with their answers 308. In some embodiments, the FAQ model 212C is a BERT-based model.

Figure 4:
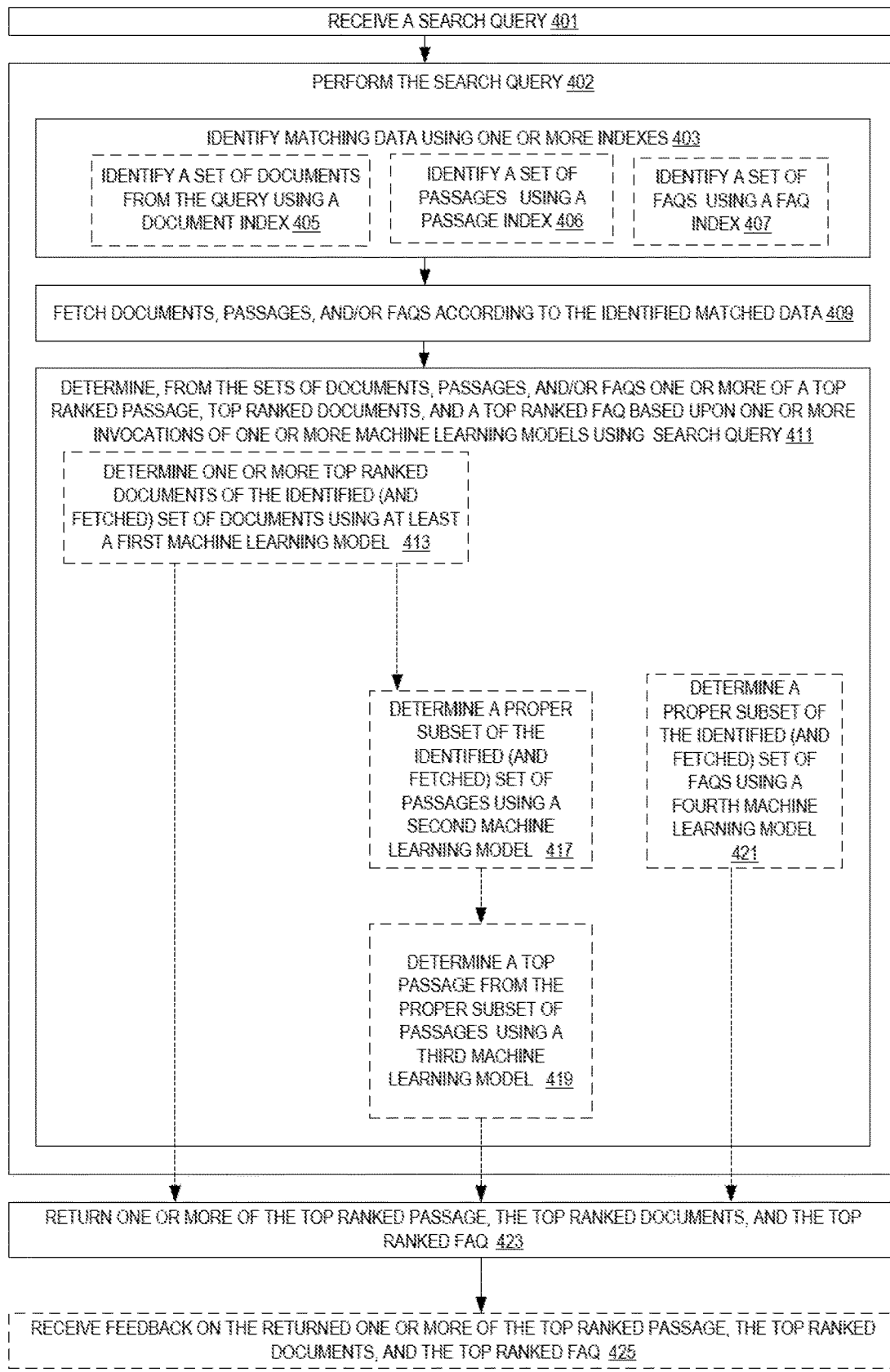
FIG. 4 illustrates embodiments of a method for performing an inference (search on documents).

FIG. 4 illustrates embodiments of a method for performing an inference (search on documents). Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures such as under the control of the inference orchestrator 220 which calls the indexing service 140 for document identifiers, fetches the identified documents using the document storage service 208, and calls one or more ML models in the model hosting service 110 to analyze the fetched documents.

At 401, a search query is received in a frontend. The search query includes a question to be answered. In some embodiments, the search query includes an indication of what type of answer is expected (e.g., a listing of documents, a passage, and/or an FAQ). For example, prefix (or postfix) such as passage:QUESTIONTEXT may be used. Or, a selection from a list of potential results may be used. Examples of a search query API call have been detailed above.

The search query is performed to generate one or more results at 402. Documents that matches the search query are identified by querying one or more indexes at 403. For example, in some embodiments, an index for documents is queried for a set "top" matching documents at 405, an index for passages is queried for a set of "top" matching passages at 406, and/or an index for FAQs is queried for a set of "top" FAQs at 407. Note that these indexes may be independent of each other or combined in any manner. As noted, an inference orchestrator may cause these one or more queries to occur. In some embodiments, the query is formed such that is requests a "match" for the words of the question. A match query returns documents that match provided text, numbers, dates, or Boolean values. The match query may limit the number of results, the number of words of the question to use, etc.

At 409, the identified documents, passages, and/or FAQs are fetched according to the matched data at 409. As discussed, an inference orchestrator may cause these one or more fetches to occur. The documents, passages, and/or FAQs may be stored in separate locations or together. Additionally, the documents, passages, and/or FAQs may be pre-processed to make subsequent analysis easier. In some embodiments, the fetching is of whole documents. In some embodiments, the fetching is of extracted text from the documents.

One or more of a top ranked passage, top ranked documents, and a top ranked FAQ are determined from the fetched documents, passages, and/or FAQs based upon one or more invocations of one or more machine learning models for the search query at 411. Several operations may occur in this action. Note the models produce a confidence score for their results.

In some embodiments, a proper subset of the identified (fetched) set of documents are determined using a first machine learning model at 413. For example, in some embodiments, the fetched documents are reranked using a first model (e.g., DCN model) according to relevance scores and then a second model (e.g., BERT-based) looks at some top number of those reranked documents (e.g., 100) and uses top passages from the retrieved passages for those top documents to determine a relevance score per document. The relevance scores from the first and second models are combined to generate a set of top ranked documents. In other embodiments, only the reranking using the first model is performed.

In some embodiments, a proper subset of the identified (and fetched) set of passages is identified using a second machine learning model based upon the query and fetched passages at 417. This proper subset is a reranking of the passages. This may be the same model as the BERT-based model detailed as being used at 413. This reranked subset is provided to a third model (along with aspects of the query) which determines a top passage from the reranked subset at 419. The third model is a BERT-based model in some embodiments.

In some embodiments, a proper subset of the identified (and fetched) set of FAQS is determined using a fourth machine learning model on the fetched FAQs and the query at 421. This proper subset includes the top ranked FAQ. In some embodiments, the fourth machine learning model is BERT-based.

One or more of the top ranked passage, the top ranked documents, and the top ranked FAQ are returned at 423. The return may include displaying the result. In some embodiments, what is returned is subject to an access control list and/or confidence score threshold. For example, if the top ranked document, etc. is not allowed to be shared with the searching user based on the access control list, then either nothing is returned, or a lower ranked document, etc. is returned instead. In some embodiments, an improved display of the result is utilized. Note that in some embodiments, the returned result is sent back through the frontend and/or inference orchestrator.

At 425, feedback is received on the one or more of the returned one or more of the top ranked passage, the top ranked documents, and the top ranked FAQ in some embodiments. This feedback may be used to tune the models.

Figure 5:
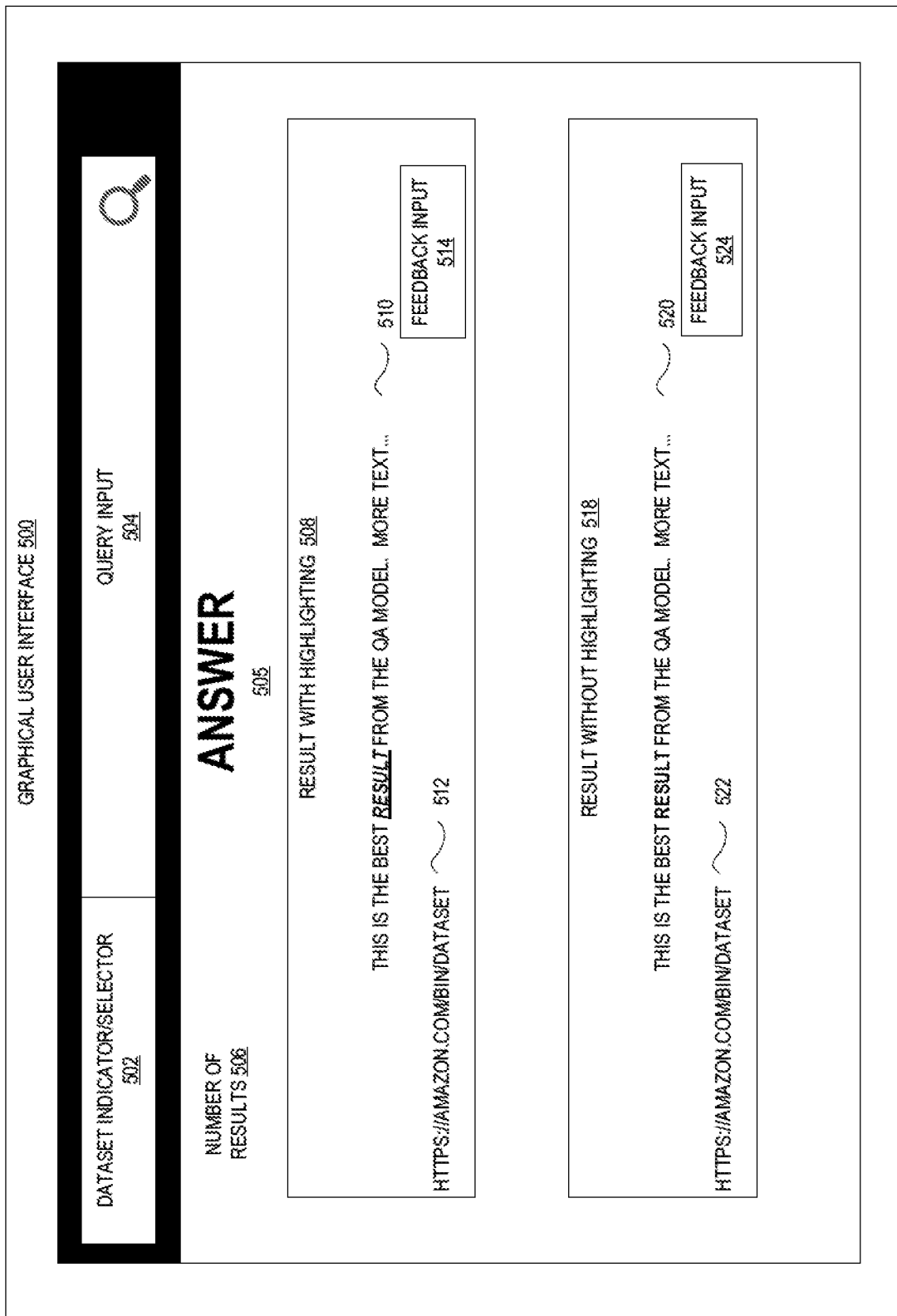
FIG. 5 illustrates embodiments of an improved display of a result of an inference query.

FIG. 5 illustrates embodiments of an improved display of a result of an inference query. As shown, a graphical user interface (GUI) 500 allows for a user to input a query using a query input mechanism 504 (e.g., an input box). In some embodiments, the user may further define the dataset using a dataset indicator/selector 502. For example, the user may define that HR documents are to be queried, or that HR FAQs are to be queried, etc. In some embodiments, by default documents, passages, and FAQs are all queried.

The GUI 500 provides an indication of a number of results 506 that are returned along with the results 508, 518 themselves. In some embodiments, an answer 505 to the question being asked is extracted and shown proximately. Note that there may be a result shown per index type (e.g., document, passage, and FAQ). In this example, the first result 508 shows text 510 which includes highlighting for a particularly relevant aspect of the result. In particular, the text "RESULT" has been highlighted from a document's text. This highlighted text is the top ranked text (or at least the top ranked text that the user is allowed to see) where the result exceeds one or more confidence score thresholds. In some embodiments, the highlighting is shown using a font change and in some embodiments the text is color highlighted (as in using a yellow background for the section of text). The first result 508 also includes the location of the result 512 (e.g., the document location) and a means to provide feedback 514, e.g., as feedback input 1106 in FIG. 11.

The second result 518 shows text 520 that less emphasizes a relevant aspect of the result. In particular, the text "RESULT" has been emphasized from a document's text, but in a less conspicuous way than the highlighted text. This emphasized text is the top ranked text (or at least the top ranked text that the user is allowed to see) where the result exceeds one or more confidence score thresholds (but not as much as a highlighted text would). The emphasis may be bolding, italicizing, underlining, changing the font size, etc. The second result 518 also includes the location of the result 522 (e.g., the document location) and a means to provide feedback 524, e.g., as feedback input 1106 in FIG. 11.

Feedback input may be in the form of an API request that includes one or more parameters such as one or more of: click feedback items (alert that the search result was taken), an identifier of the index that was queried, an identifier of the query itself, relevance such as a thumbs-up or thumbs-down.

Figure 6:
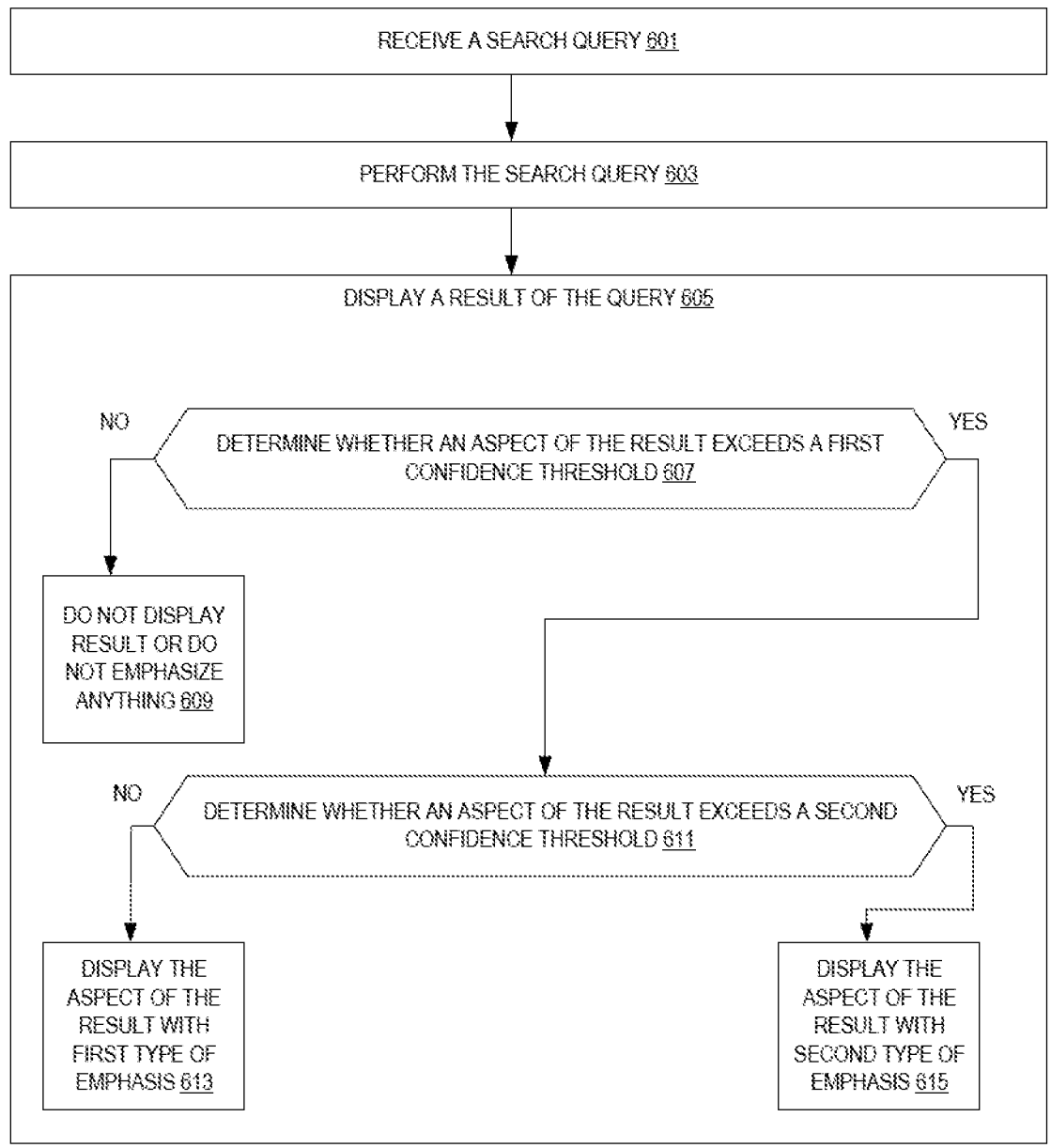
FIG. 6 illustrates embodiments of a method for performing an improved display of a result of an inference query.

FIG. 6 illustrates embodiments of a method for performing an improved display of a result of an inference query. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures.

A search query is received at 601. For example, a search query is received at the frontend 104 and passed to the inference orchestrator 220. Examples of search queries have been detailed above.

The search query is performed to generate one or more results at 603. Embodiments of such performance have been detailed above (e.g., with respect to at least FIG. 4). The results may include, but are not limited to: text from top ranking documents, a top ranked passage, a top ranked FAQ, etc. In some embodiments, the performance of the search query includes using one or more ML models.

The one or more results are displayed at 605. Note that in some embodiments, the returned result is sent back through the frontend 104 and/or inference orchestrator 220 for display. It is typically in one of these components that a determination of what can be shown and/or emphasizing certain aspects of a result is/are made. For example, the application of an access control list, etc.

In this example, it is assumed that the result is allowed to be displayed, but how the result is to be displayed differs depending upon how confident the underlying models were in their analysis. At 607, a determination is made as to if an aspect of the result exceeds a first confidence threshold. For example, does the result from one or more ML models indicate that the result is deemed to be fairly correct based on the confidence score of the one or more ML models. When the confidence score is low, this indicates that the result may not be particularly good. When the first threshold is not met, then the result is either not shown, or there is no emphasis in the display of the result at 609.

When the first threshold is met, then the result is shown with emphasis. The type of emphasis may differ depending upon a determination whether an aspect of the result exceeds a second confidence threshold that is greater than the first threshold made at 611. When the second threshold is not met, then a first type of emphasis is used to emphasize the aspect at 613. Examples of a first type of emphasis include, but are not limited to: bolding, underlining, changing a font, changing a font size, and italicizing. When the second threshold is met, then a second type of emphasis is used to emphasize the aspect at 615. This second type of emphasis is meant to stand out more than the first type of emphasis and may include highlighting, bolding, underlining, changing a font, changing a font size, italicizing, or a combination thereof. Note that the first and second type of emphasis are different.

Figure 7:
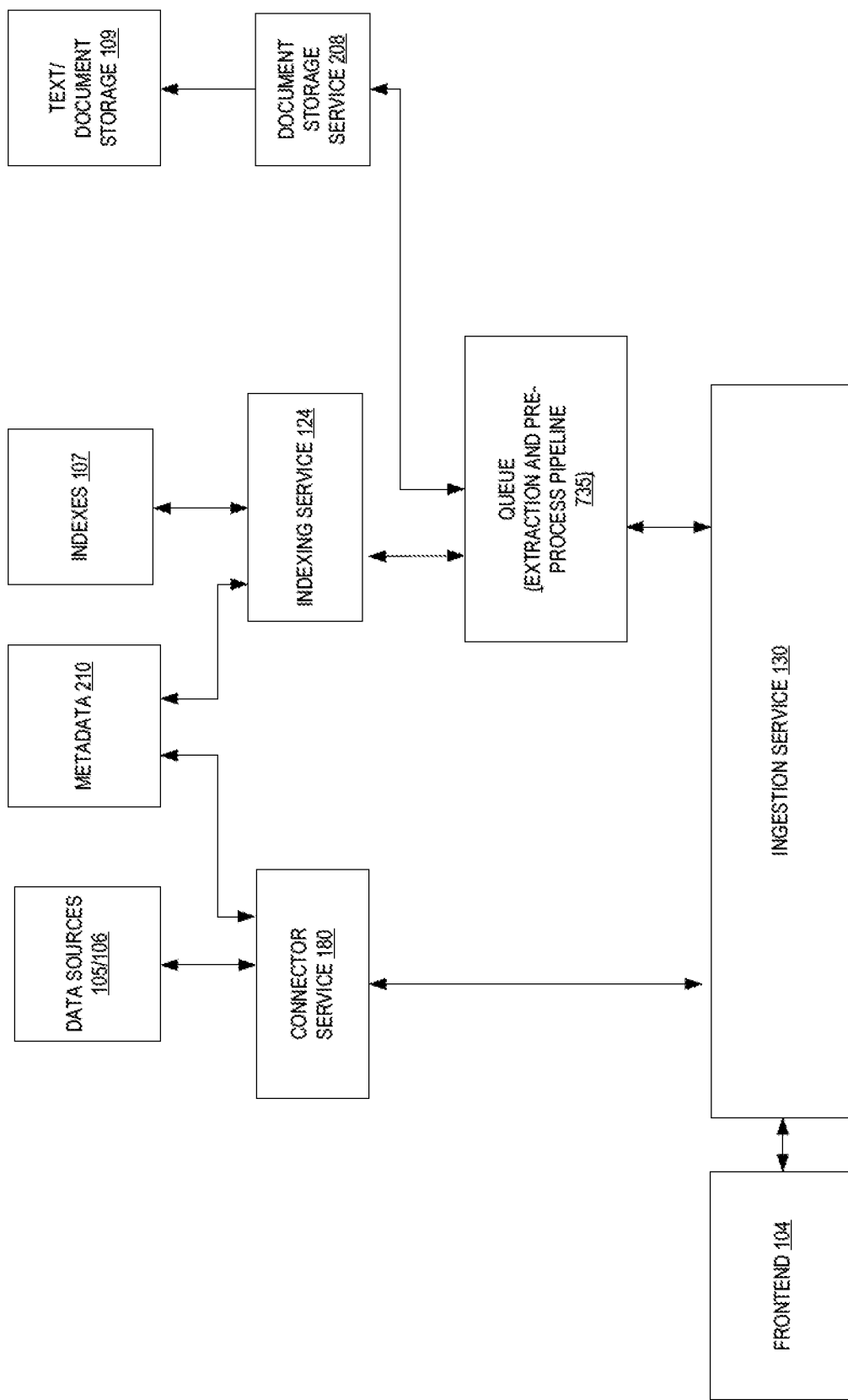
FIG. 7 illustrates embodiments of the enterprise search service 102 used for providing ingestion functionality.

FIG. 7 illustrates embodiments of the enterprise search service 102 used for providing ingestion functionality. The frontend 104 takes in intake requests, index creation requests, etc. and passes those requests to the ingestion service 130. The ingestion service 130 performs document validation on documents retrieved from data sources 105/106. In some embodiments, the ingestion service 130 co-ordinates various services to perform index creation, index updating, and other ingestion tasks detailed below. In other embodiments, the ingestion service places documents to be processed in a queue 735 which includes an extraction and pre-preprocess pipeline. intake requests ask that a set of documents be in taken such that the documents are acquired, indexed, pre-processed, stored, etc.

As shown, the ingestion service 130 is coupled to a plurality of services. The connector service 180 receives (either as a push or a pull) documents from data sources 105/106 where the physical location may be provided by metadata 210. The indexing service 124 is pulls documents and/or text from the queue 735 (which may be pre-processed) and to create or update indexes 107 associated with documents (including passages and FAQs). The metadata 210 may provide the physical location of those indexes 107. The document storage service 208 also pulls documents from the queue 735 to store documents to store documents and chunks thereof in text/document storage 109.

Prior to updating an index, it needs to be created. In some embodiments, a create index API call is received by the frontend 104 which calls the indexing service 124 to generate an index of indexes 107. The create index request includes one or more fields to inform the behavior of the indexing service 124 such as a field for a description of the index, field for an index name, a field for the role that gives permission for logs and metrics, a field identifying an encryption key, etc.

When an index has been created, it can be updated. This updating may be in the form of a single update or batch update which causes an ingestion of text and unstructured text into an index, the addition of custom attributes to the documents (should it be desired), an attachment of an access control list to the documents added to the index, a storage of the text, a pre-processing of the text (and storage thereof), etc. In some embodiments, a update request includes one or more fields to inform the behavior of the indexing service 124, the document storage service 208, the queue 735 include extraction and pre-processing pipeline, and the connector service 180 and includes one or more fields such as a field for a location of one or more documents, a field for the documents themselves, a field for the index's name, a field for the role that gives permission for logs and metrics, etc. The extraction and pre-processing pipeline extracts text from documents and pre-processes them (e.g., tokenize, etc.). In some embodiments, the extracted text (e.g., tokens) is broken down into overlapping passages using sliding windows by the extraction and pre-process pipeline. The overlapping passages are then indexed and/or stored.

Figure 8:
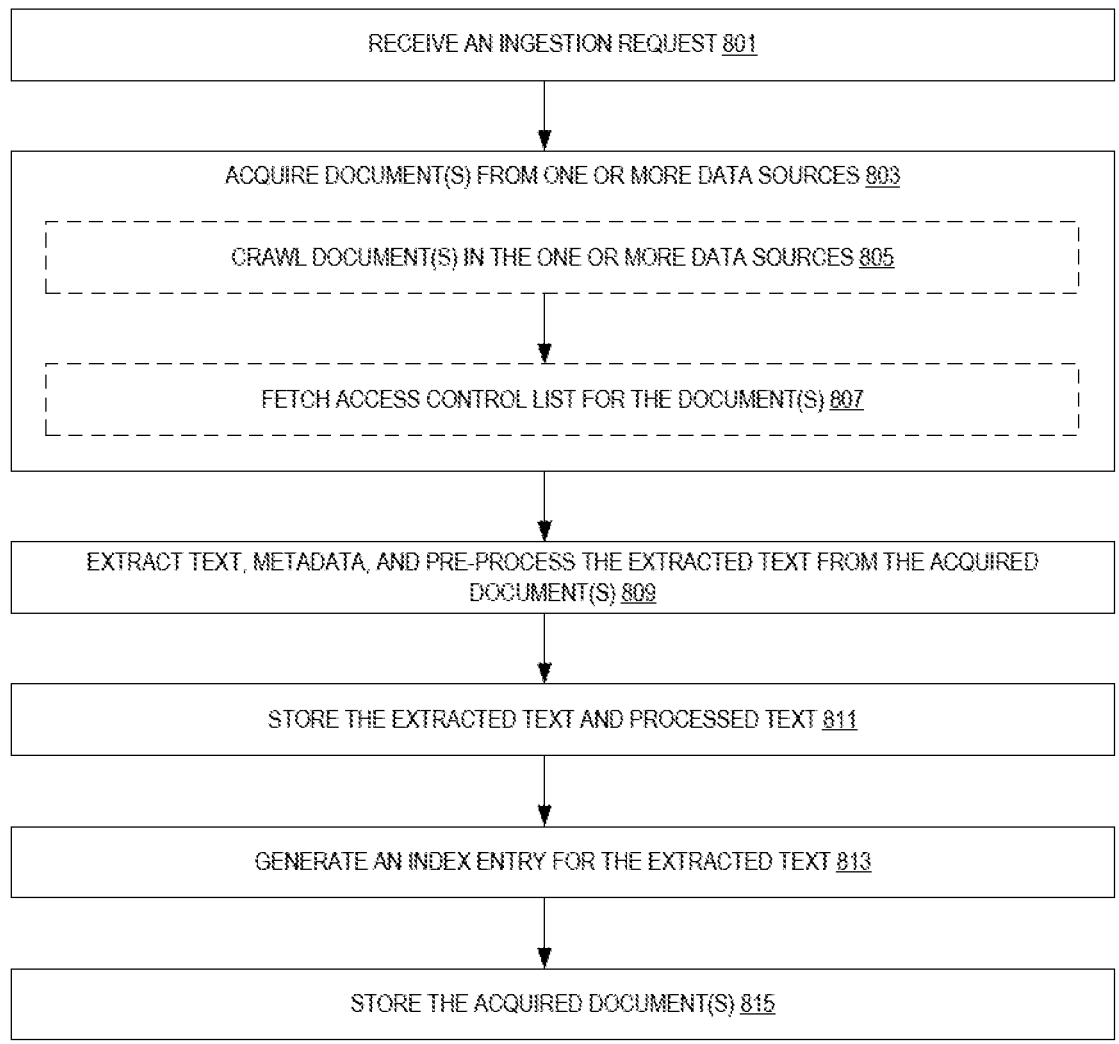
FIG. 8 illustrates embodiments of a method for performing ingestion of one or more documents.

FIG. 8 illustrates embodiments of a method for performing ingestion of one or more documents. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures.

At 801, an intake request is received. For example, the frontend 104 receives the intake request.

One or more documents are acquired from one or more data sources according to the request at 803. For example, when the request indicates a particular storage bucket, documents are gathered from that bucket. Note that acquiring could simply be pulling one or more documents from the intake request.

In some embodiments, the documents are acquired by crawling of one or more data sources at 805. This crawling of documents is performed by the connector service 180 in some embodiments and may include gathering from internal and/or external sources.

In some embodiments, the ACL for the acquired one or more documents is fetched at 807. As noted above, ACLs may be used to determine what results a user can see for a performed inference. The ACL may be stored with the document or pointed to by the document's owner.

Text is extracted from the acquired one or more documents and pre-processed at 809. Metadata may also be extracted. For example, text may be extracted from a document that includes non-text such as images. The pre-processing of the extracted text includes one or more of tokenizing, normalizing, and/or removing noise. This is performed by the extraction and pre-processing pipeline 735 per document acquired. Note that extracted text may include passages.

The extracted text and pre-processed text are stored at 811. This may be performed by the document storage service 208 which puts this extracted text and pre-processed text in text/document storage 109. The text and/or pre-processed text are used during inference.

At 813, index entries for the extracted text are generated. In some embodiments, the index entry includes a pointer to an ACL. The generation of the index includes mapping labels of the document into fields for the index entry. In some embodiments, this mapping utilizes reserved fields. Reserved fields are "default" fields that allow for standardization across multiple different accounts. This standardization may help in the training of the models used in an inference as developing a corpus of training data should be easier when common labels are used (as opposed to training using different labels per user account). For example, a reserved field of "TITLE" allows user account 1 and user account 2 to use the same label in their documents. In some embodiments, existing labels are mapped to the reserved fields. That mapping may be automatic or according to a mapping provided by an administrator.

In some embodiments, the underlying acquired documents are stored at 815.

FIG. 9 illustrates embodiments of exemplary reserved fields for use in ingestion. Documents can use labels to indicate what the text is. For example, a label indicating the text is the title. As discussed above, index entries include fields for the text content and these fields correspond to labels. In the enterprise search service 102 described herein a set of "reserved" labels may be utilized in index entry fields. These reserved labels allow for text to be labeled in a common manner between documents, users, etc.

Examples of names of "reserved" fields 901 and their corresponding datatypes 903 are shown. In some embodiments, body and title are default. While these fields are "reserved," in some embodiments these fields are updatable. For example, if the name "modification date" is not what anyone is using, it can be changed to reflect usage. Additionally, new "reserved" fields may be added as needed or desired. Note that the use of "reserved" fields may be overridden in some embodiments.

Figure 10:
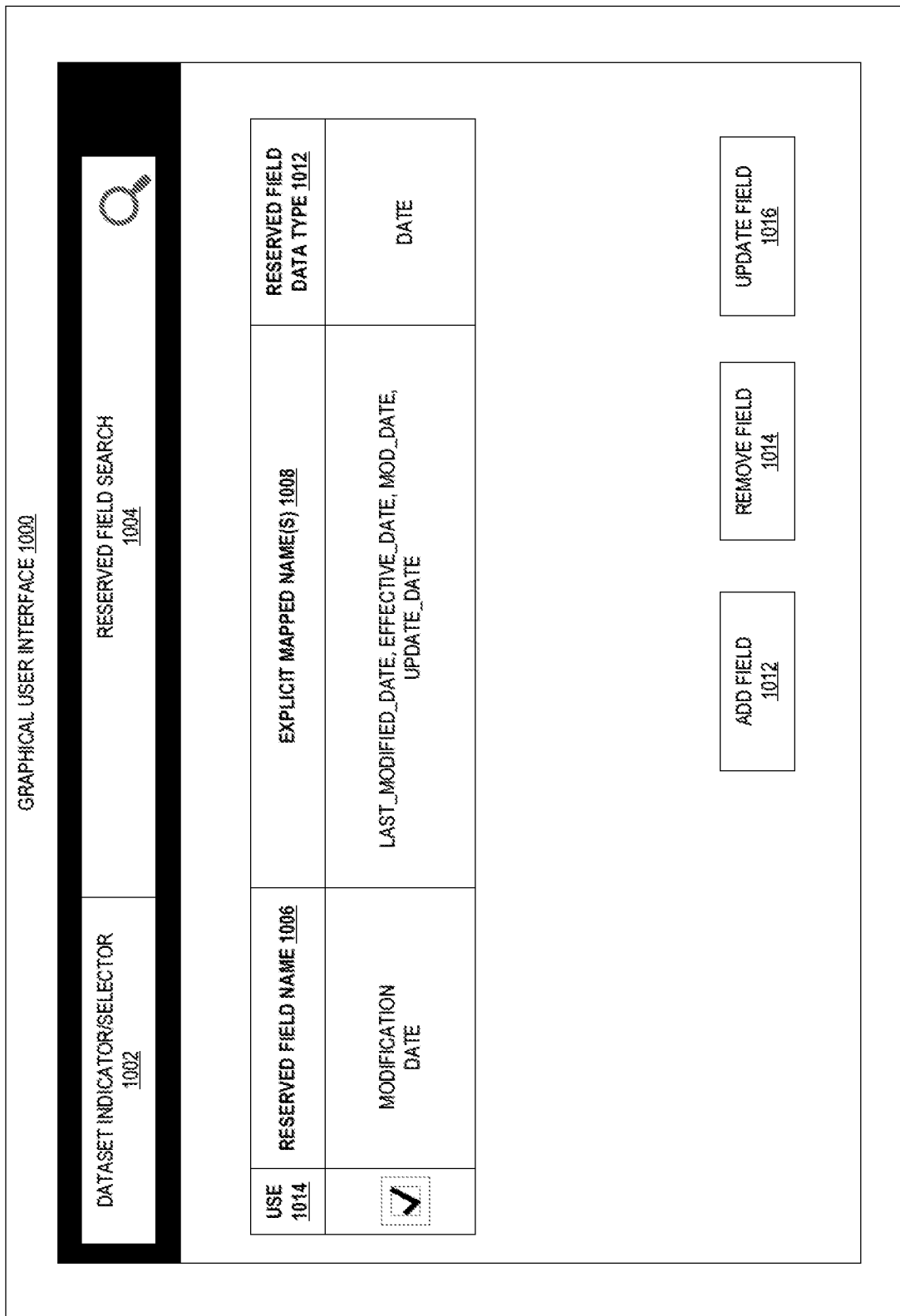
FIG. 10 illustrates embodiments of a graphical user interface to be used in updating/adding/removing reserved fields for use in ingestion.

FIG. 10 illustrates embodiments of a graphical user interface to be used in updating/adding/removing reserved fields for use in ingestion. As shown, a GUI 1000 allows for a user to adjust reserved fields including adding a field, removing a field, and updating a field.

The GUI 1000 includes a reserved field search mechanism 1004 (e.g., an input box). In some embodiments, the user may further define the dataset using a dataset indicator/selector 1002. For example, the user may define that HR documents have a certain set of reserved fields, whereas finance documents use a different set.

The display includes, per reserved field, a reserved field name 1006, an explicit mapping to the name field 1008, data type field 1012, and an indication of if the reserved field is used. The reserved field name 1006 is the label used by the indexing service 140. The explicit mapping to the name field 1008 allows for a user to provide to the indexing service 140 a mapping of labels in existing documents to the reserved field. The fields 1006, 1008, and 1012 are editable and the application of the update field functionality 1016 commits changes.

When the add field functionality 1018 is used, a new reserved field entry is added allowing a user to add reserved field name, an explicit mapping to the name field, data type field, and an indication of if the reserved field is used. This may be performed using one or more GUIs (not shown).

A field can be removed using the use field 1014 and then applying the remove field functionality 1014.

Figure 11:
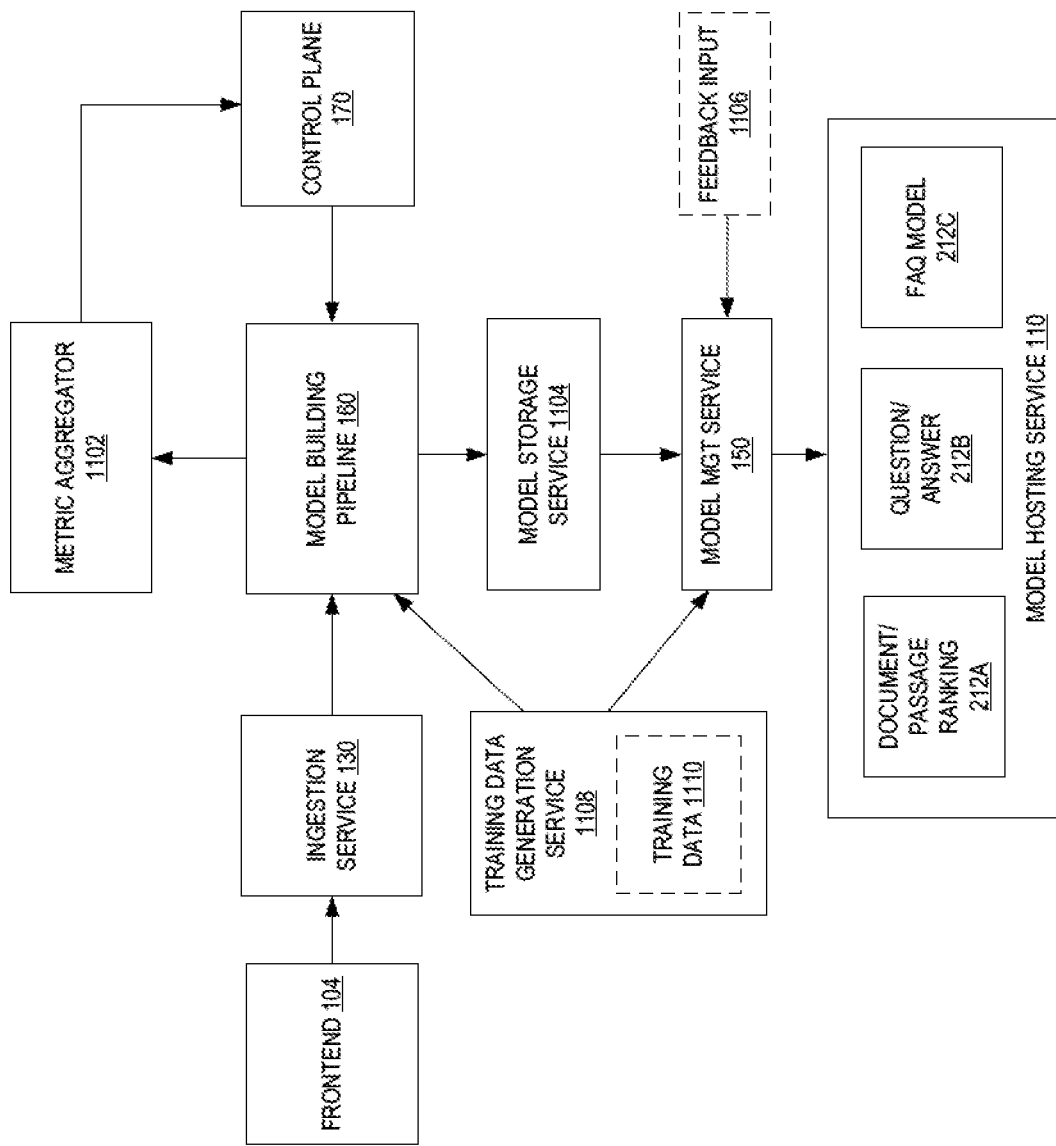
FIG. 11 illustrates embodiments of a model building system.

FIG. 11 illustrates embodiments of a model building system. Model building system may be utilized to build the model and refresh it. Depicted model building system includes frontend 104 coupled to an ingestion service 130, a model building pipeline 160 coupled to the ingestion service 130, a metric aggregator 1102, a control plane 170, and a model storage service 1104. Depicted model building system includes metric aggregator 1102 coupled to control plane 170, and model storage service 1104 coupled to model management service 150. Depicted model management service is coupled to model hosting service 110, which may host one or any combination of: document/passage ranking model(s) 212A, question/answer model 212B, and FAQ model 212C.

In one embodiment, ingestion service 130 receives a document or documents that are to be ingested, and sends a report of the ingestion metrics (e.g., metrics that indicate the number of documents, the index size of the corpus of documents, index failures, etc.) to metric aggregator 1102, metric aggregator 1102 polls if document corpus has changed enough (e.g., exceed a threshold) to trigger model building, when the model build is triggered, an indication is sent to control plane 170 such that the control plane cause the model building pipeline 160 to build the model (e.g., machine learning model), the built model is then saved by model storage service 1104. Model building system may further include a training data generation service 1108, e.g., to create training data 1110 from the user's data. Training data 1110 may be utilized by the model building pipeline 160 in creation of a model and/or used by model management service 150 in the refresh of a model.

A model (e.g., at or after initial use) may have improved functionality with further training. The training may be based at least in part on feedback input 1106, e.g., feedback provided by a user. In certain embodiments, a model management service 150 is to pull the model (e.g., from model storage service 1104) and refresh it (e.g., based on feedback input 1106). Refreshing the model may include utilizing the feedback (e.g., from feedback input 1106 or other feedback) in a next training iteration of the model. A next version of the model formed from the next training iteration may then be used by saving the model to model hosting service 110, e.g., where the updated model is one or any combination of: document/passage ranking model(s) 212A, question/answer model 212B, and FAQ model 212C. A model refresh (or displaying of a proper subset of the data for labeling by the user in active learning) may be triggered when a confidence value (e.g., score) of a proper subset of the data (e.g., answers and/or documents) the model returns for a search query falls below a confidence threshold. Additionally or alternatively, a model refresh (or displaying of a proper subset of the data for labeling by the user in active learning) may be triggered in response to exceeding a confidence difference threshold for a difference between a first confidence score for a first section (e.g., a first, highest scored candidate answer or candidate document) of the proper subset of the data with respect to its relevance to the search query and a second confidence score for a second section (e.g., a second, next highest scored candidate answer or candidate document) of the proper subset of the data with respect to its relevance to the search query. A proper subset of the data (e.g., answers and/or documents) for presentation to the user (e.g., to be used for labeling by the user in active learning) may be selected based on a confidence value of the proper subset of the data the model returns for a search query.

The feedback input 1106 may include click-through data (e.g., how many times a provided link is selected by a user) and/or customer annotated data (e.g., as discussed below in reference to FIGS. 13 and 14).

A model may include an input of a search query for a search of ingested data (e.g., the user's documents) and an output of a best answer from a plurality of answers from the data and/or an output of a best document from a plurality of documents from the data. Active learning may be utilized to train the model where a user is to request that the user indicate the desired output (e.g., answer(s) or document(s)) for an input (e.g., search query). However, instead of requiring a user to indicate which answers and/or documents are the most important for a search query (e.g., question) from the entirety (or substantially the entirety) of the data, certain embodiments herein present a proper subset of the data to the user for their indication which answers and/or documents are the most important for a search query. Thus, these embodiments allow a user to perform the labeling (e.g., as being important enough to use for a next iteration of training) of the data without overwhelming them with uninformative document(s).

In one embodiment, based on the current performance of the model, active learning is applied to suggest a specific subset of user query (or queries) and document candidates and/or answer candidates to a user (e.g., a human) for labeling. Thus, the suggested subset of document candidates and/or answer candidates provide more value towards improving the machine learning model compared to a randomly sampled set. There may be different approaches for active learning. One example is to check the difference between the confidence scores from the top candidates, e.g., and if the difference is less than a threshold, the model then needs refinement on such queries. Another example is diversity sampling in order to have larger coverage of the data. Next, a user (e.g., customer) can label the relevance of the document and answer candidates (e.g., by selecting an interface element of a graphical user interface). In certain embodiments, when a threshold amount of annotated data (e.g. 1000 samples) are received, the machine learning model is retrained using the annotated data (e.g., and the accuracy of the retrained model is evaluated on a held-out set of data from the user's data (e.g., ingested data)). In one embodiment, if the improvement exceeds a certain threshold, the previous version of the model is replaced with the retrained model. The above can be repeated based on a pre-determined schedule.

Figure 12:
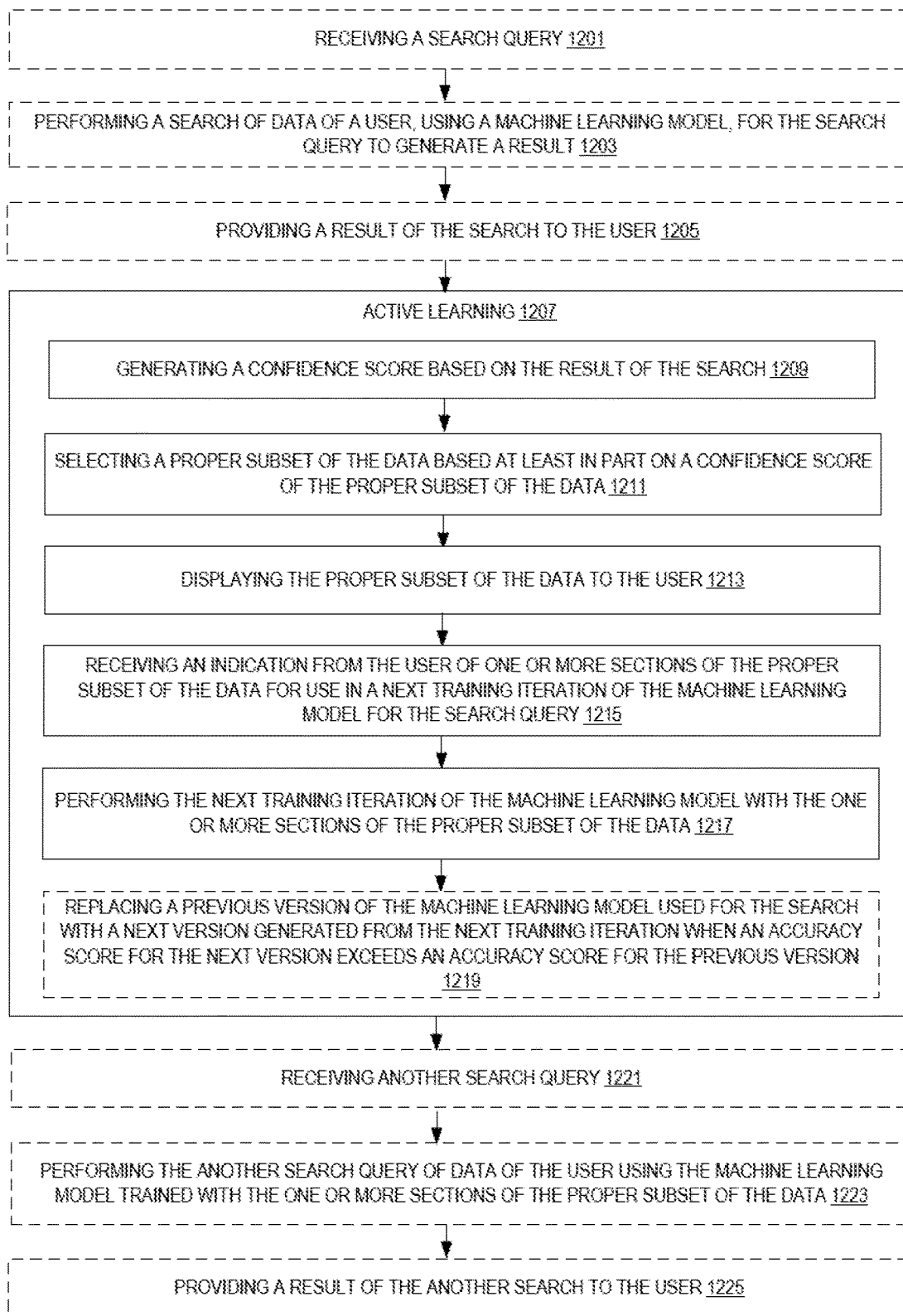
FIG. 12 illustrates embodiments of a method for model management.

FIG. 12 illustrates embodiments of a method for model management, for example, implemented by model management service 150. Depicted model management includes (optionally) receiving a search query 1201, (optionally) performing a search of data of a user, using a machine learning model, for the search query to generate a result 1203, and (optionally) providing a result of the search to the user 1205. Active learning 1207 includes generating a confidence score (e.g., by the machine learning model) based on the result of the search 1209, selecting a proper subset of the data based at least in part on a confidence score of the proper subset of the data 1211, displaying the proper subset of the data to the user 1213, receiving an indication from the user of one or more sections of the proper subset of the data for use in a next training iteration of the machine learning model for the search query 1215, performing the next training iteration of the machine learning model with the one or more sections of the proper subset of the data 1217, and (optionally) replacing a previous version of the machine learning model used for the search query with a next version generated from the next training iteration when an accuracy score for the next version exceeds an accuracy score for the previous version 1219. After performing active learning 1207, (optionally) another search query may be received 1221, then performing the another search query of data of the user using the machine learning model trained with the one or more sections of the proper subset of the data 1223, and providing a result of the another search to the user 1225.

FIG. 13 illustrates embodiments of a graphical user interface 1300 to be used in active learning of question and answer(s) for training a machine learning model. Depicted graphical user interface 1300 includes a field 1302 that is customizable with text to indicate that the user is to take an action (e.g., "Please select the following answer(s) that are relevant to the indicated query") and a field 1304 to be populated with the query that the user is to label the answers for relevancy. Optionally, the number of candidate answers 1306 may be indicated.

Graphical user interface 1300 includes a plurality of entries 1308A-B and each entry includes a feedback input 1310A-B, respectively. Although two entries are shown, any plurality of entries may be utilized (e.g., where "X" is any positive integer). In the depicted embodiment, a query 1304 that is to have active learning performed on it is provided as well as a plurality of candidate answers, e.g., as discussed herein. For example, with candidate answers including a passage 1312 with the answer highlighted (e.g., bold, underlined, marked as a different color, etc.) and the passage of surrounding text also included (e.g., to provide context to the user for their reading comprehension of the answer and its possible relevancy to the query). A link 1314 may also be included to the source document.

As depicted, the example query 1304 is "how much does package pick-up cost?". Candidate answer 1 1308A includes a passage 1312A stating "There is nocharge for this option. We will pick up your return at the address of your choice." A user may deem that candidate answer 1 to be relevant (e.g., a most important answer(s)) and mark feedback input 1310A (shown as a checkbox as an example). Candidate answer 2 1308B includes a passage 1312B stating "If you choose the Pickup option and the return is not a result of our error, you will be charged a convenience fee of $XX.XX for the Pickup." (where XX.XX is an actual number value). A user may deem that candidate answer 2 to be relevant (e.g., independent of candidate answer 1 being relevant) and mark feedback input 1310B (shown as a checkbox as an example). The highlighting may be added to the result provided by the model, and the surrounding words (e.g., the sentence before and/or after the result) also provided. Feedback input 1310 may be another interface element, such as, but not limited to a thumbs up (or down), checkbox, button, dropdown menu, etc.

A user may click the submit interface element 1316 to cause the feedback input(s) to be sent, e.g., as feedback input 1106 in FIG. 11. Feedback input may be aggregated, e.g., to trigger a retrain of a model as discussed herein.

Figure 14:
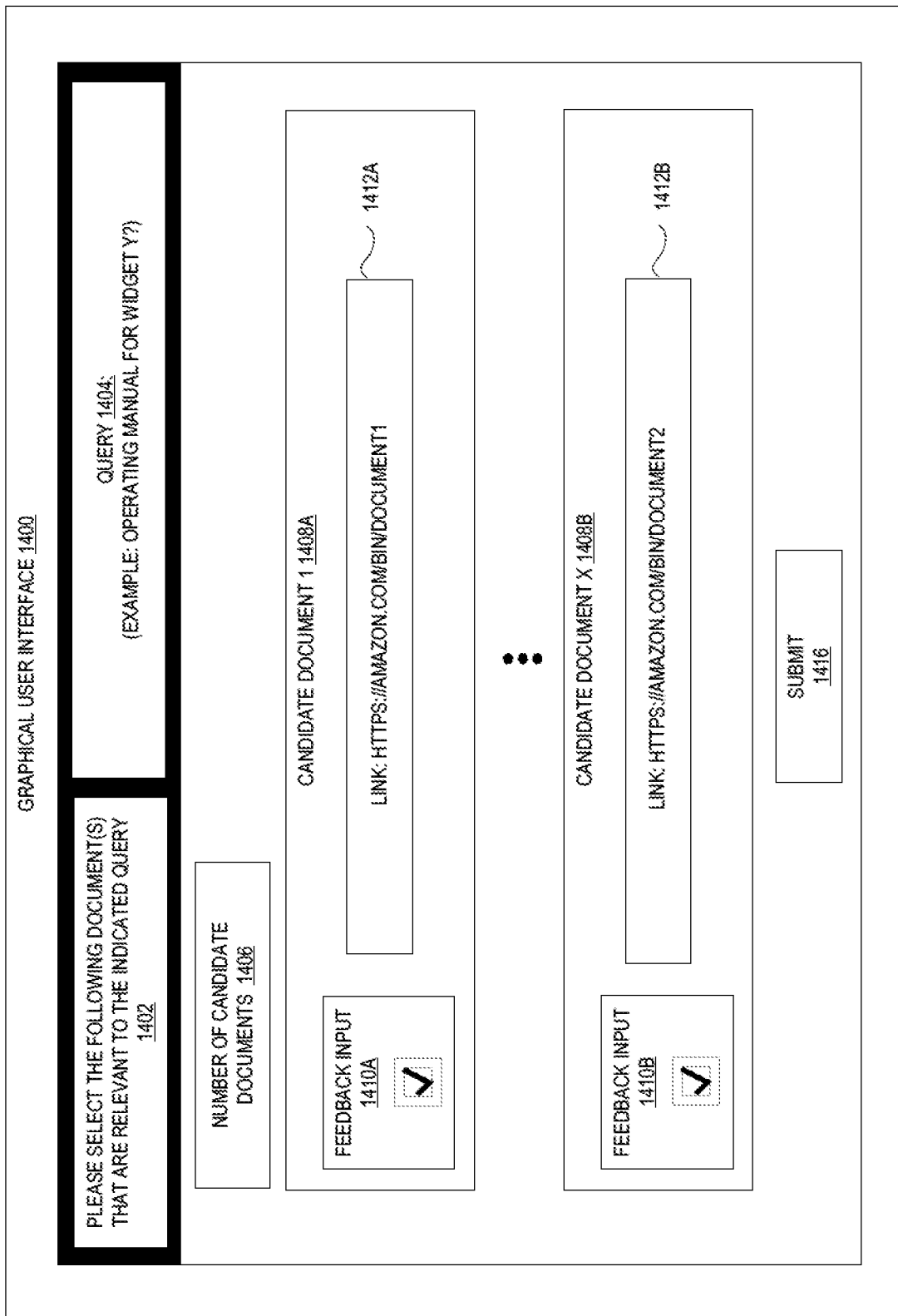
FIG. 14 illustrates embodiments of a graphical user interface to be used in active learning of document ranking for training a machine learning model.

FIG. 14 illustrates embodiments of a graphical user interface to be used in active learning of document ranking for training a machine learning model. Depicted graphical user interface 1400 includes a field 1402 that is customizable with text to indicate that the user is to take an action (e.g., "Please select the following document(s) that are relevant to the indicated query") and a field 1404 to be populated with the query that the user is to label the documents for relevancy. Optionally, the number of candidate documents 1406 may be indicated.

Graphical user interface 1400 includes a plurality of entries 1408A-B and each entry includes a feedback input 1410A-B, respectively. Although two entries are shown, any plurality of entries may be utilized (e.g., where "X" is any positive integer). In the depicted embodiment, a query 1404 that is to have active learning performed on it is provided as well as a plurality of candidate documents, e.g., as discussed herein. For example, with candidate documents including a link 1412 to the (e.g., hosted in storage 109) document.

As depicted, the example query 1404 is "operating manual for widget Y?". Candidate document 1 1408A includes a link 1412A to a first document. A user may deem that candidate document 1 to be relevant (e.g., a most important document(s)) and mark feedback input 1410A (shown as a checkbox as an example). Candidate document 2 1408B includes a link 1412B to a second document. A user may deem that candidate document 2 to be relevant (e.g., independent of candidate document 1 being relevant) and mark feedback input 1410B (shown as a checkbox as an example). Feedback input 1410 may be another interface element, such as, but not limited to a thumbs up (or down), checkbox, button, dropdown menu, etc.

A user may click the submit interface element 1416 to cause the feedback input(s) to be sent, e.g., as feedback input 1106 in FIG. 11. Feedback input may be aggregated, e.g., to trigger a retrain of a model as discussed herein.

Figure 15:
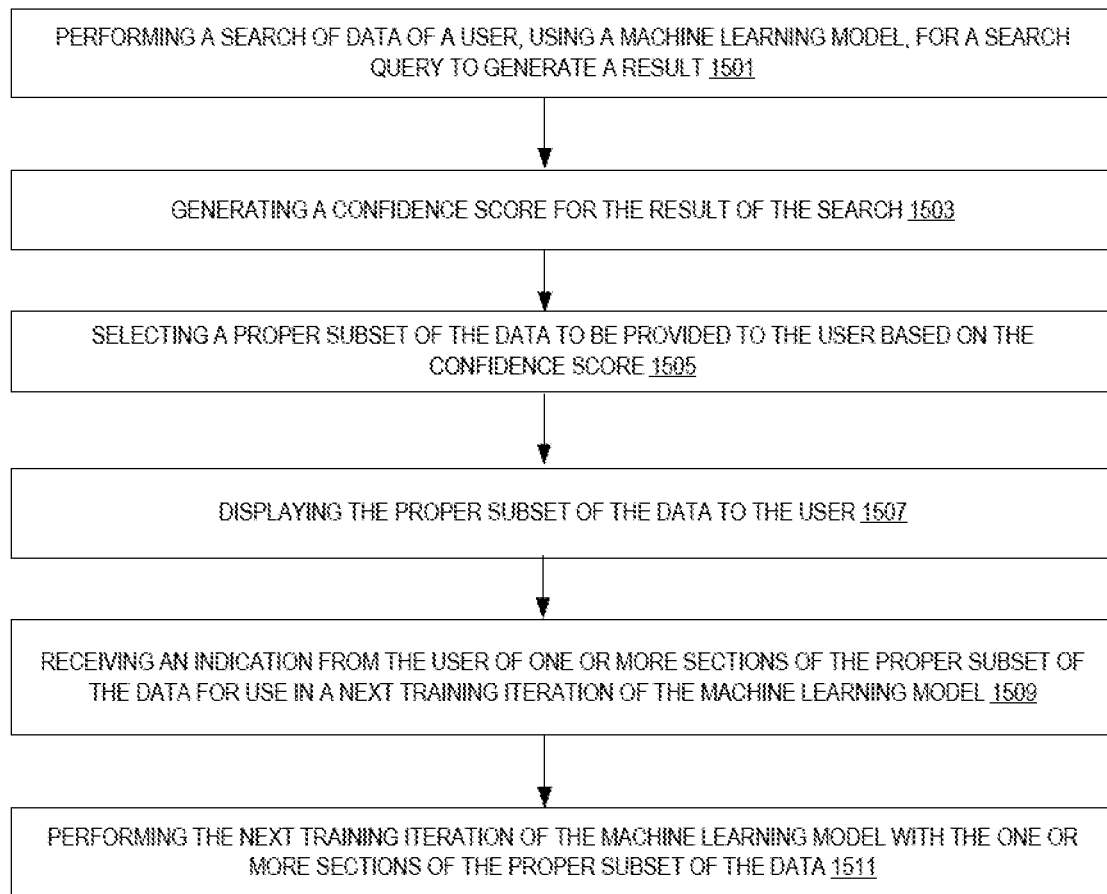
FIG. 15 illustrates embodiments of a method for active learning for training a machine learning model.

FIG. 15 illustrates embodiments of a method for active learning for training a machine learning model. Depicted method includes performing a search of data of a user, using a machine learning model, for a search query to generate a result 1501, generating a confidence score for the result of the search 1503, selecting a proper subset of the data to be provided to the user based on the confidence score 1505, displaying the proper subset of the data to the user 1507, receiving an indication from the user of one or more sections of the proper subset of the data for use in a next training iteration of the machine learning model 1509, and performing the next training iteration of the machine learning model with the one or more sections of the proper subset of the data 1511.

In certain embodiment, the models discussed herein (e.g., document/passage ranking model(s) 212A, question/answer model 212B, and FAQ model 212C) are trained with a set of training data. Training data may include a question and a corresponding answer from a user's data (e.g., in contrast to public data or data from other enterprises). However, the generation of such pairs of questions and answers may require annotation by a human, and thus be costly in terms of time and expense and/or prone to human errors. Training data may be used by a model building system (e.g., model building system depicted in FIG. 11). Model building system may include a training data generation service (e.g., training data generation service 1108 in FIG. 11), for example, to create training data 1110 from a user's data. Training data (e.g., training data 1110 in FIG. 11) may be utilized by a model building pipeline (e.g., model building pipeline 160 in FIGS. 1 and 11) in creation of a model and/or used by a model management service (e.g., model management service 150 in FIGS. 1 and 11) in a refresh of a model.

Certain embodiments herein remove a human from generating training data, for example, by removing the human from identifying a question for an answer and/or identifying an answer from a question. These embodiments may include training a language machine learning model to identify (e.g., generate) a set of question and answers pairs from a user's data (e.g., from their unstructured text data) without requiring human annotation or other human involvement.

In one embodiment, a request to build a model (e.g., with model building pipeline 160 in FIGS. 1 and 11) causes a service (e.g., training data generation service 1108 in FIG. 11) to generate training data from a user's data. Training data may include questions and their corresponding answers, e.g., candidate questions generated by the service for probable answers in a user's data. Completed training data may then be provided to a model building pipeline for use in building a model specifically for a user's data.

Figure 16:
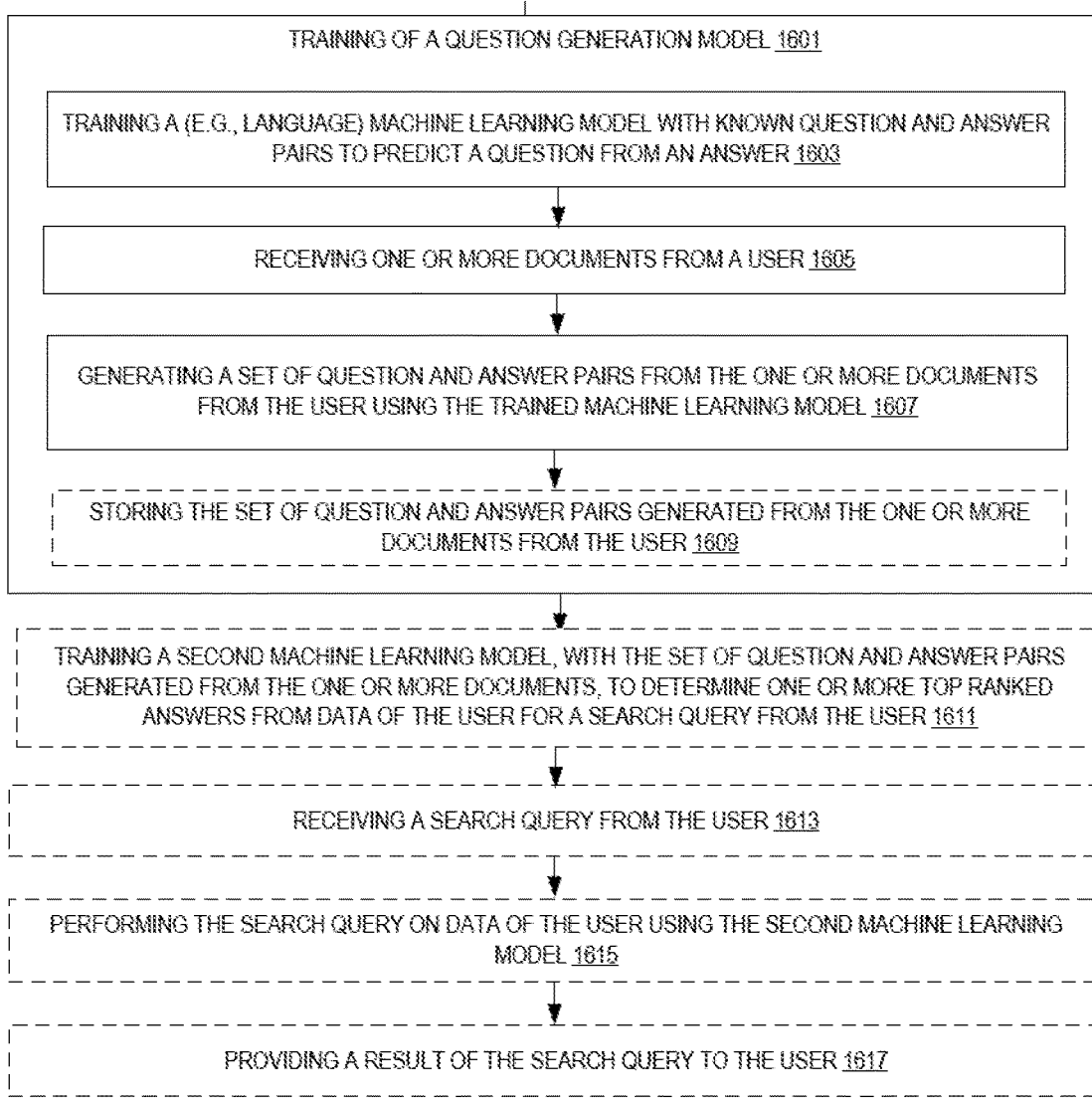
FIG. 16 illustrates embodiments of a method for training and use of a question generation model.

FIG. 16 illustrates embodiments of a method for training and use of a question generation model. In certain embodiments, the training data to be generated is a set of one or more candidate questions from a user's data (e.g., the user's documents, passages, etc.) containing answers. Depicted method in FIG. 16 includes training of a question generation model 1601. In one embodiment, the training of question generation model 1601 includes training a (e.g., language) machine learning model with known question and answer pairs to predict a question from an answer 1603. The known question and answer pairs may be data that does not include the user's data (e.g., data not from the user), e.g., this data may be public data. Examples of "known question and answer pairs" are within a MAchine Reading COmprehension (MARCO) dataset. The known question and answer pairs may be public data, e.g., in contrast to the user's private data (e.g., that is hosted in storage 109 in FIG. 1).

One example of a language machine learning (ML) model is a transformer-based language model that predicts the next word of a string of text based on the previous words within the string of text. Certain embodiments herein modify a language ML model used to predict the next word for each successive word of a string of text to predict each next (e.g., successive) word of a question for a given answer, e.g., to predict each successive word of a known question (e.g., a multiple word question) from its known answer (e.g., a multiple word answer). One example language ML model is a transformer model (e.g., a GPT-2 model) that is first trained on (e.g., a very large amount of) data in an unsupervised manner using language modeling as a training signal, and is second fine-tuned on much smaller supervised datasets (e.g., known questions and their corresponding known answers) to help it solve specific tasks.

Referring to FIG. 16, training 1601 includes training a (e.g., language) machine learning model with known question and answer pairs to predict a question from an answer 1603, receiving one or more documents from a user 1605, generating a set of question and answer pairs from the one or more documents from the user using the trained machine learning model 1607, and (optionally) storing the set of question and answer pairs (e.g., in training data 1110 storage in FIG. 11) generated from the one or more documents from the user 1609.

In certain embodiments, the training data (e.g., which has been generated by a machine and not by a human or using human's annotations) is then used to train another machine learning model. For example, training a second machine learning model (e.g., document/passage ranking model(s) 212A, question/answer model 212B, and FAQ model 212C), with the set of question and answer pairs (e.g., from training data 1110 storage in FIG. 11) generated from the one or more documents of the user's, to determine one or more top ranked answers from data of the user for a search query from the user 1611.

After training the second machine learning model, it may then be used, for example, after receiving a search query from the user 1613, for performing the search query on data (e.g., documents) of the user using the second machine learning model 1615, and providing a result of the search query to the user 1617, e.g., a result of one or more of a top ranked document, top ranked passage, or top ranked question.

In certain embodiments, the language ML model is also trained to detect an end of question (EOQ) token. In certain embodiments, the input to a language model to generate training data (e.g., generate questions for known answers) includes a passage having the answer and the question, for example, in the format of a beginning of service indicator (e.g., <bos>) followed by beginning of question indicator (e.g., <boq>), followed by the question, and then followed by an end of question indicator (e.g., <eoq>).

FIG. 17 illustrates a first set of example candidate questions generated by a question generation model trained on known question and answer pairs. In FIG. 17, example synthetic question generation 1700 includes a known question 1702 (e.g., with an end of question token), a passage with a known answer 1704 to the known question 1702, and illustrates the candidate questions (e.g., and their end of question token <eoq>) generated by the model 1706 trained to generate synthetic questions from those two inputs 1702 and 1704. The model trained to do so may thus be used on a user's data to generate specific training data based on the user's (e.g., customer's) documents, e.g., instead of only being trained on other's documents.

FIG. 18 illustrates a second set of example candidate questions generated by a question generation model trained on known question and answer pairs. In FIG. 18, example synthetic question generation 1800 includes a known question 1802 (e.g., with an end of question token), a passage with a known answer 1804 to the known question 1802, and illustrates the candidate questions (e.g., and their end of question token <eoq>) generated by the model 1806 trained to generate synthetic questions from those two inputs 1802 and 1804. The model trained to do so may thus be used on a user's data to generate specific training data based on the user's (e.g., customer's) documents, e.g., instead of only being trained on other's documents. In one embodiment, a same model is used to generate questions 1806 in FIG. 18 and questions 1706 in FIG. 17. Trained model may then be used to generate training data that is subsequently used to train a second machine learning model (e.g., document/passage ranking model(s) 212A, question/answer model 212B, and FAQ model 212C), e.g., and the trained, second machine learning model used as discussed herein.

Figure 19:
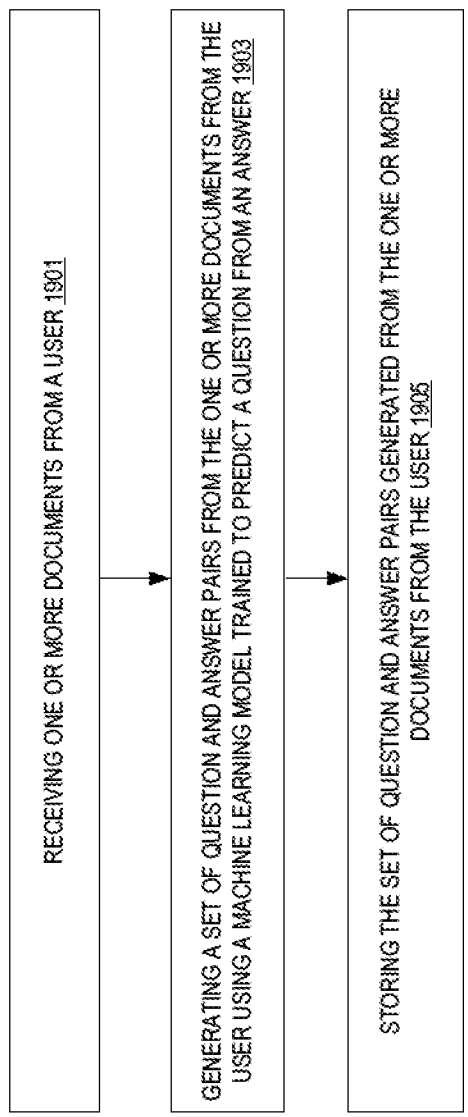
FIG. 19 illustrates embodiments of a method for training a question generation model.

FIG. 19 illustrates embodiments of a method for training a question generation model. Depicted method includes receiving one or more documents from a user 1901, generating a set of question and answer pairs from the one or more documents from the user using a machine learning model trained to predict a question from an answer 1903, and storing the set of question and answer pairs generated from the one or more documents from the user 1905.

Figure 20:
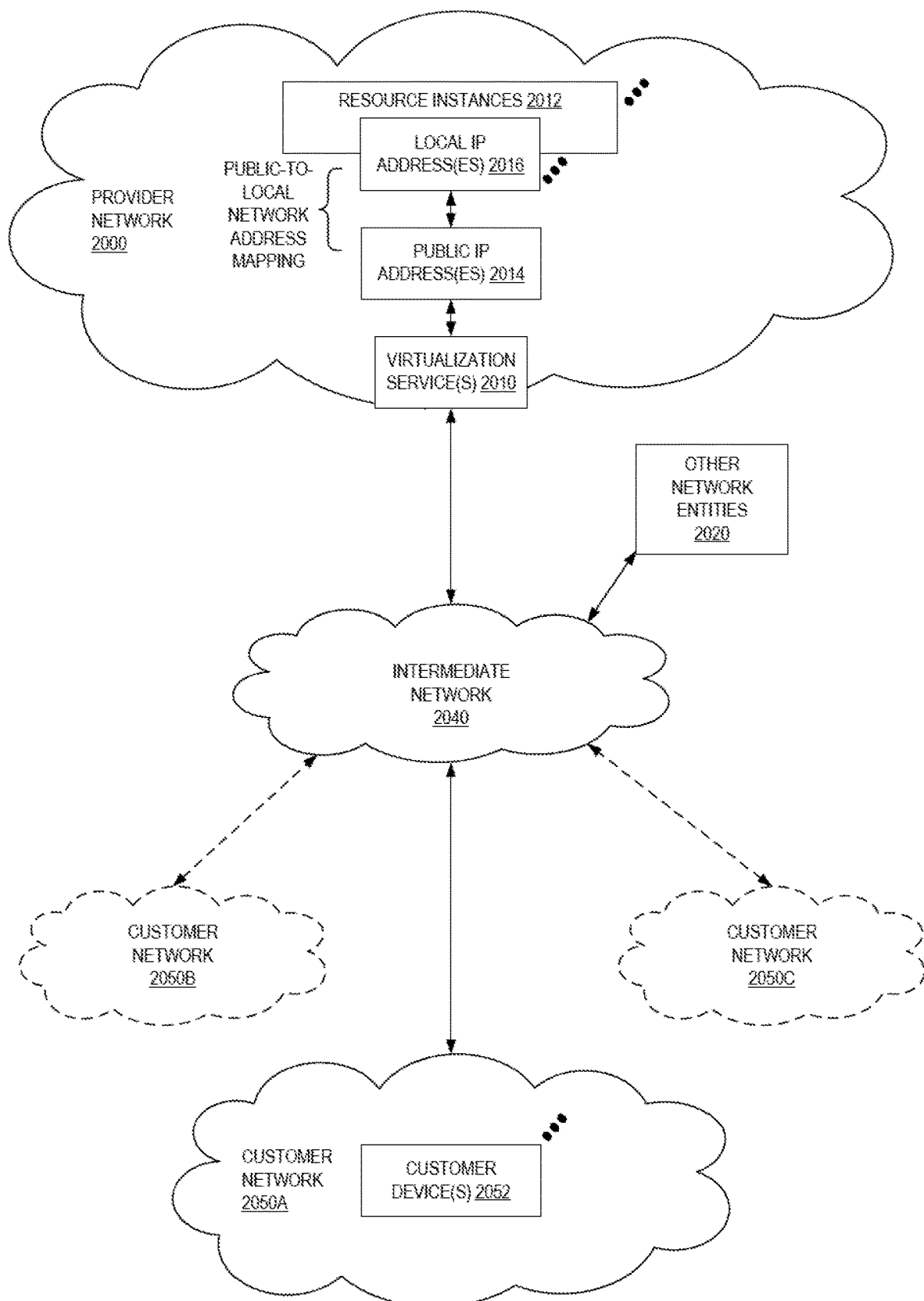
FIG. 20 illustrates an example provider network environment according to some embodiments.

FIG. 20 illustrates an example provider network (or "service provider system") environment according to some embodiments. A provider network 2000 may provide resource virtualization to customers via one or more virtualization services 2010 that allow customers to purchase, rent, or otherwise obtain instances 2012 of virtualized resources, including but not limited to computation and storage resources, implemented on devices within the provider network or networks in one or more data centers. Local Internet Protocol (IP) addresses 2016 may be associated with the resource instances 2012; the local IP addresses are the internal network addresses of the resource instances 2012 on the provider network 2000. In some embodiments, the provider network 2000 may also provide public IP addresses 2014 and/or public IP address ranges (e.g., Internet Protocol version 4 (IPv4) or Internet Protocol version 6 (IPv6) addresses) that customers may obtain from the provider 2000.

Conventionally, the provider network 2000, via the virtualization services 2010, may allow a customer of the service provider (e.g., a customer that operates one or more client networks 2050A-2050C including one or more customer device(s) 2052) to dynamically associate at least some public IP addresses 2014 assigned or allocated to the customer with particular resource instances 2012 assigned to the customer. The provider network 2000 may also allow the customer to remap a public IP address 2014, previously mapped to one virtualized computing resource instance 2012 allocated to the customer, to another virtualized computing resource instance 2012 that is also allocated to the customer. Using the virtualized computing resource instances 2012 and public IP addresses 2014 provided by the service provider, a customer of the service provider such as the operator of customer network(s) 2050A-2050C may, for example, implement customer-specific applications and present the customer's applications on an intermediate network 2040, such as the Internet. Other network entities 2020 on the intermediate network 2040 may then generate traffic to a destination public IP address 2014 published by the customer network(s) 2050A-2050C; the traffic is routed to the service provider data center, and at the data center is routed, via a network substrate, to the local IP address 2016 of the virtualized computing resource instance 2012 currently mapped to the destination public IP address 2014. Similarly, response traffic from the virtualized computing resource instance 2012 may be routed via the network substrate back onto the intermediate network 2040 to the source entity 2020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 2000; a customer may then assign their allocated public IP addresses to particular resource instances allocated to the customer. These public IP addresses may be referred to as customer public IP addresses, or simply customer IP addresses. Instead of being assigned by the provider network 2000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 21:
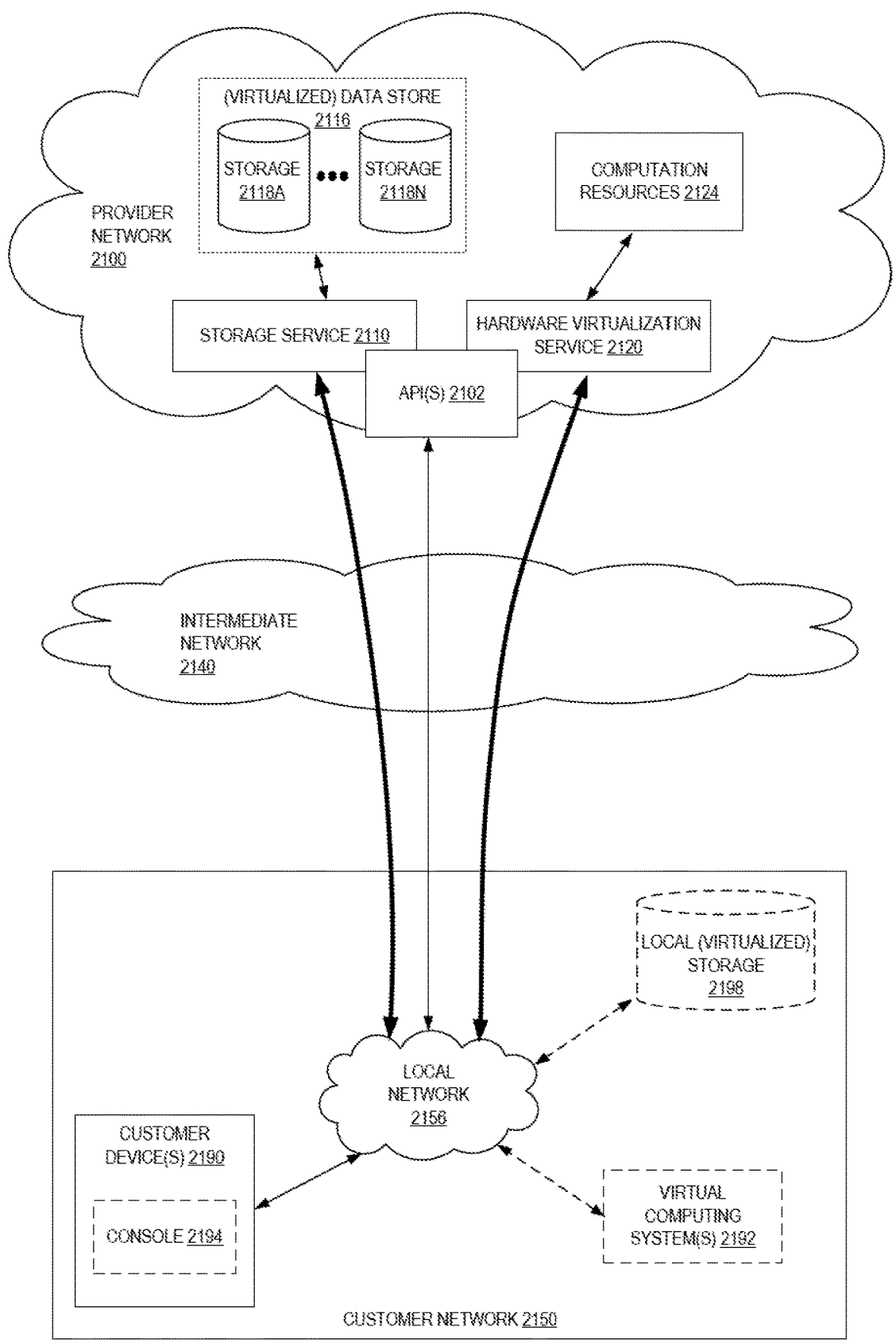
FIG. 21 is a block diagram of an example provider network that provides a storage service and a hardware virtualization service to customers according to some embodiments.

FIG. 21 is a block diagram of an example provider network that provides a storage service and a hardware virtualization service to customers, according to some embodiments. Hardware virtualization service 2120 provides multiple computation resources 2124 (e.g., VMs) to customers. The computation resources 2124 may, for example, be rented or leased to customers of the provider network 2100 (e.g., to a customer that implements customer network 2150). Each computation resource 2124 may be provided with one or more local IP addresses. Provider network 2100 may be configured to route packets from the local IP addresses of the computation resources 2124 to public Internet destinations, and from public Internet sources to the local IP addresses of computation resources 2124.

Provider network 2100 may provide a customer network 2150, for example coupled to intermediate network 2140 via local network 2156, the ability to implement virtual computing systems 2192 via hardware virtualization service 2120 coupled to intermediate network 2140 and to provider network 2100. In some embodiments, hardware virtualization service 2120 may provide one or more APIs 2102, for example a web services interface, via which a customer network 2150 may access functionality provided by the hardware virtualization service 2120, for example via a console 2194 (e.g., a web-based application, standalone application, mobile application, etc.). In some embodiments, at the provider network 2100, each virtual computing system 2192 at customer network 2150 may correspond to a computation resource 2124 that is leased, rented, or otherwise provided to customer network 2150.

From an instance of a virtual computing system 2192 and/or another customer device 2190 (e.g., via console 2194), the customer may access the functionality of storage service 2110, for example via one or more APIs 2102, to access data from and store data to storage resources 2118A-2118N of a virtual data store 2116 (e.g., a folder or "bucket", a virtualized volume, a database, etc.) provided by the provider network 2100. In some embodiments, a virtualized data store gateway (not shown) may be provided at the customer network 2150 that may locally cache at least some data, for example frequently-accessed or critical data, and that may communicate with storage service 2110 via one or more communications channels to upload new or modified data from a local cache so that the primary store of data (virtualized data store 2116) is maintained. In some embodiments, a user, via a virtual computing system 2192 and/or on another customer device 2190, may mount and access virtual data store 2116 volumes via storage service 2110 acting as a storage virtualization service, and these volumes may appear to the user as local (virtualized) storage 2198.

While not shown in FIG. 21, the virtualization service(s) may also be accessed from resource instances within the provider network 2100 via API(s) 2102. For example, a customer, appliance service provider, or other entity may access a virtualization service from within a respective virtual network on the provider network 2100 via an API 2102 to request allocation of one or more resource instances within the virtual network or within another virtual network.

Illustrative Systems

Figure 22:
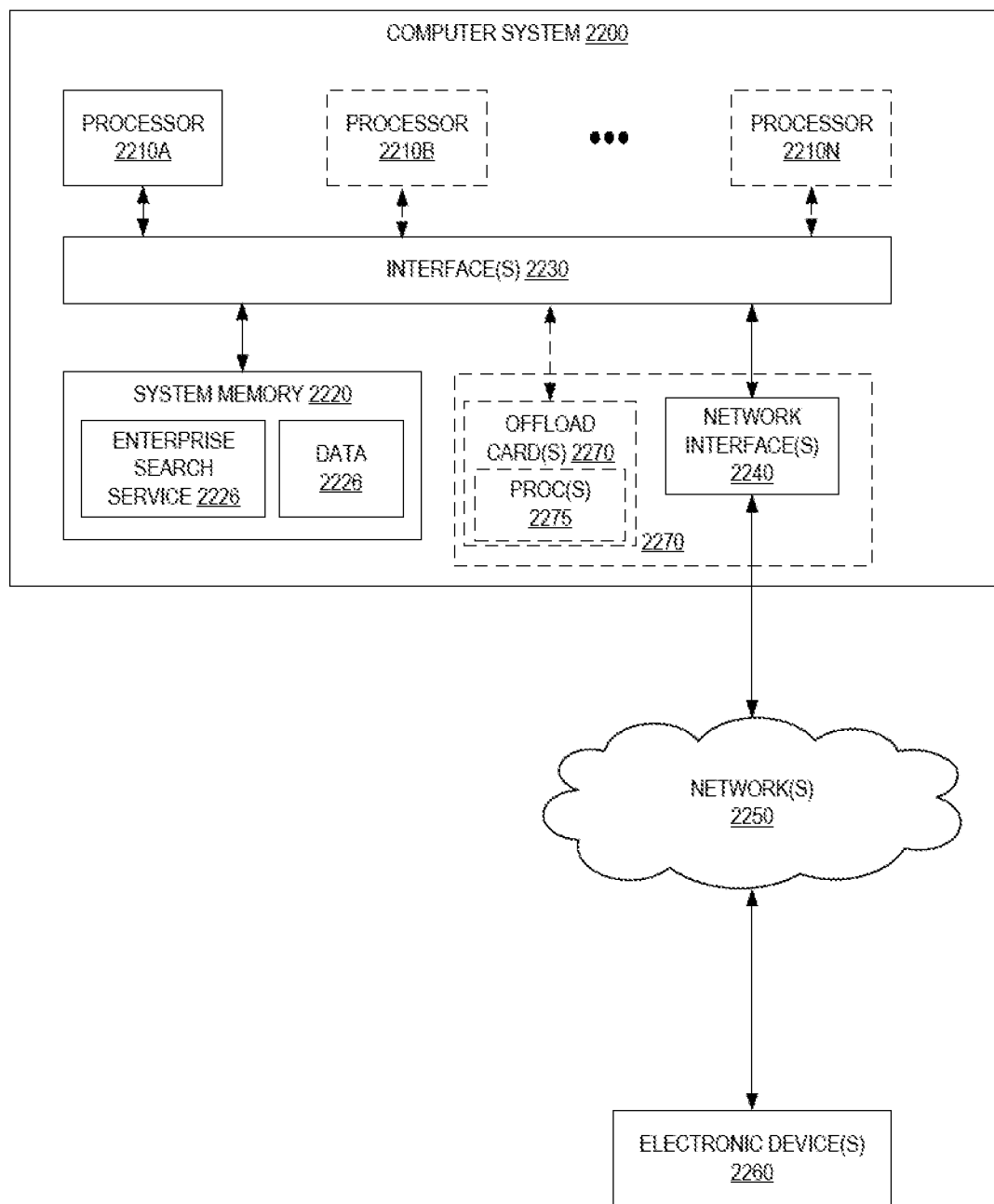
FIG. 22 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 2200 illustrated in FIG. 22. In the illustrated embodiment, computer system 2200 includes one or more processors 2210 coupled to a system memory 2220 via an input/output (I/O) interface 2230. Computer system 2200 further includes a network interface 2240 coupled to I/O interface 2230. While FIG. 22 shows computer system 2200 as a single computing device, in various embodiments a computer system 2200 may include one computing device or any number of computing devices configured to work together as a single computer system 2200.

In various embodiments, computer system 2200 may be a uniprocessor system including one processor 2210, or a multiprocessor system including several processors 2210 (e.g., two, four, eight, or another suitable number). Processors 2210 may be any suitable processors capable of executing instructions. For example, in various embodiments, processors 2210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 2210 may commonly, but not necessarily, implement the same ISA.

System memory 2220 may store instructions and data accessible by processor(s) 2210. In various embodiments, system memory 2220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 2220 as enterprise search service code 2225 and data 2226.

In one embodiment, I/O interface 2230 may be configured to coordinate I/O traffic between processor 2210, system memory 2220, and any peripheral devices in the device, including network interface 2240 or other peripheral interfaces. In some embodiments, I/O interface 2230 may perform any necessary protocol, timing or other data transformations to convert data signals from one component (e.g., system memory 2220) into a format suitable for use by another component (e.g., processor 2210). In some embodiments, I/O interface 2230 may include support for devices attached through various types of peripheral buses, such as a variant of the Peripheral Component Interconnect (PCI) bus standard or the Universal Serial Bus (USB) standard, for example. In some embodiments, the function of I/O interface 2230 may be split into two or more separate components, such as a north bridge and a south bridge, for example. Also, in some embodiments some or all of the functionality of I/O interface 2230, such as an interface to system memory 2220, may be incorporated directly into processor 2210.

Network interface 2240 may be configured to allow data to be exchanged between computer system 2200 and other devices 2260 attached to a network or networks 2250, such as other computer systems or devices as illustrated in FIG. 1, for example. In various embodiments, network interface 2240 may support communication via any suitable wired or wireless general data networks, such as types of Ethernet network, for example. Additionally, network interface 2240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 2200 includes one or more offload cards 2270 (including one or more processors 2275, and possibly including the one or more network interfaces 2240) that are connected using an I/O interface 2230 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 2200 may act as a host electronic device (e.g., operating as part of a hardware virtualization service) that hosts compute instances, and the one or more offload cards 2270 execute a virtualization manager that can manage compute instances that execute on the host electronic device. As an example, in some embodiments the offload card(s) 2270 can perform compute instance management operations such as pausing and/or un-pausing compute instances, launching and/or terminating compute instances, performing memory transfer/copying operations, etc. These management operations may, in some embodiments, be performed by the offload card(s) 2270 in coordination with a hypervisor (e.g., upon a request from a hypervisor) that is executed by the other processors 2210A-2210N of the computer system 2200. However, in some embodiments the virtualization manager implemented by the offload card(s) 2270 can accommodate requests from other entities (e.g., from compute instances themselves), and may not coordinate with (or service) any separate hypervisor.

In some embodiments, system memory 2220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2200 via I/O interface 2230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 2200 as system memory 2220 or another type of memory. Further, a computer-accessible medium may include transmission media or signals such as electrical, electromagnetic, or digital signals, conveyed via a communication medium such as a network and/or a wireless link, such as may be implemented via network interface 2240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a first request to ingest a first document from a first data source into an enterprise search service in a provider network;
acquiring the first document from the first data source based on crawling for documents in the first data source, and fetching an access control list for the first document;
extracting a first text from the acquired first document;
generating a first index entry for the extracted first text, the first index entry mapping the extracted first text to a reserved label of a plurality of reserved labels reserved by the enterprise search service for use by user accounts of the enterprise search service for labeling text in documents ingested into the enterprise search service in a common manner;
receiving a second request to ingest a second document from a second data source into the enterprise search service;
acquiring the second document from the second data source based on crawling for documents in the second data source, and fetching an access control list for the second document;
extracting a second text from the acquired second document;
generating a second index entry for the extracted second text, the second index entry mapping the extracted second text to the reserved label;
training a machine learning model based on a corpus of training data including using the reserved label as a common label for the extracted first text and the extracted second text;
using the generated first index entry to identify the extracted first text as a candidate answer to a given query;
using the trained machine learning model to a generate a confidence score for the extracted first text and the given query;
determining that the confidence score exceeds a threshold; and
indicating in a displayed graphical user interface that the extracted first text is an answer to the given query.

2. The computer-implemented method of claim 1, further comprising:
causing display of a graphical user interface providing graphical user interface controls for selecting whether the enterprise search service is to use the reserved label for labeled text extracted from documents ingested into the enterprise search service from the first data source.

3. The computer-implemented method of claim 1, wherein the plurality of reserved labels comprise one or more of "data source", "document type", "body", "title", "view count", "source URI", "category", "modification date", "creation date", "description", "authors", and "tags".

4. A computer-implemented method comprising:
receiving a first request to ingest a first document from a first data source into an enterprise search service in a provider network;
extracting a first text from the first document;
generating a first index entry for the extracted first text, the first index entry mapping the extracted first text to a reserved label of a plurality of reserved labels reserved by the enterprise search service for use by user accounts of the enterprise search service for labeling text in documents ingested into the enterprise search service in a common manner;

receiving a second request to ingest a second document from a second data source into the enterprise search service;

extracting second text from the second document;

generating a second index entry for the extracted second text, the second index entry mapping the extracted second text to the reserved label;

training a machine learning model based on a corpus of training data including using the reserved label as a common label for the extracted first text and the extracted second text; and causing display of a graphical user interface that indicates that the extracted first text is an answer to a given query.

5. The computer-implemented method of claim 4, further comprising:

causing display of a graphical user interface providing graphical user interface controls for selecting whether the enterprise search service is to use the reserved label for labeled text extracted from documents ingested into the enterprise search service from the first data source.

6. The computer-implemented method of claim 4, wherein the plurality of reserved labels comprise one or more of "data source", "document type", "body", "title", "view count", "source URI", "category", "modification date", "creation date", "description", "authors", and "tags".

7. The computer-implemented method of claim 4, further comprising:

causing display of a graphical user interface providing graphical user interface controls for mapping a label associated with the first data source to the reserved label.

8. The computer-implemented method of claim 4, wherein the given query is in a form of a natural language question; and wherein the first text is indicated in the graphical user interface as an answer to the natural language question.

9. The computer-implemented method of claim 4, wherein the first text is labeled with the reserved label in the first document and the second text is labeled with the reserved label in the second document.

10. The computer-implemented method of claim 4, wherein the first data source is associated with a first user account authorized to access the enterprise search service and the second data source is associated with a second user account authorized to access the enterprise search service.

11. The computer-implemented method of claim 4, further comprising:

mapping a first label labeling the first text in the first document to the reserved label; and mapping a second label labeling the second text in the second document to the reserved label.

12. The computer-implemented method of claim 4, wherein the first data source is external to the provider network.

13. The computer-implemented method of claim 4, wherein the first data source is in the provider network.

14. The computer-implemented method of claim 4, further comprising:

including a pointer to an access control list controlling access to the first document in the first index entry; and using the access control list to verify that a user account is authorized to access the first document before causing display of the graphical user interface that indicates that the extracted first text is an answer to the given query.

15. A system comprising:

a first data storage to store one or more documents for a first user account authorized to access an enterprise search service in a provider network;

a second data storage to store one or more documents for a second user account authorized to access the enterprise search service;

one or more electronic devices to implement the enterprise search service, the enterprise search service including instructions that upon execution cause the enterprise search service to:

receive a first request to ingest a first document from the first data storage;

extract a first text from the first document;

generate a first index entry for the extracted first text, the first index entry to map the extracted first text to a reserved label of a plurality of reserved labels reserved by the enterprise search service for use by user accounts of the enterprise search service for labeling text in documents ingested into the enterprise search service in a common manner;

receive a second request to ingest a second document from the second data storage;

extract a second text from the second document;

generate a second index entry for the extracted second text, the second index entry to map the extracted second text to the reserved label;

train a machine learning model based on a corpus of training data including using the reserved label as a common label for the extracted first text and the extracted second text; and indicate in a displayed graphical user interface that the extracted first text is an answer to a given query.

16. The system of claim 15, wherein the first data storage and the second data storage are in the provider network.

17. The system of claim 15, wherein the first text is labeled with the reserved label in the first document and the second text is labeled with the reserved label in the second document.

18. The system of claim 15, wherein the given query is in a form of a natural language question; and wherein the first text is indicated in the graphical user interface as an answer to the natural language question.

19. The system of claim 15, wherein the threshold is a first threshold; and wherein the first text is highlighted in the displayed graphical user interface with an emphasis determined based on the confidence score exceeding a second threshold in addition to exceeding the first threshold.

20. The system of claim 15, wherein the enterprise search service further includes instructions that upon execution cause the enterprise search service to:

include a pointer to an access control list controlling access to the first document in the first index entry; and use the access control list to verify that the first user account is authorized to access the first document before causing display of the graphical user interface that indicates that the extracted first text is an answer to the given query.

* * * * *